(12) United States Patent
Bradley et al.

(10) Patent No.: US 11,897,533 B2
(45) Date of Patent: Feb. 13, 2024

(54) TELESCOPING HANDLE

(71) Applicant: DEKA Products Limited Partnership, Manchester, NH (US)

(72) Inventors: Margaret B. Bradley, Belgrade, ME (US); Otis L. Clapp, Epping, NH (US)

(*) Notice: Subject to any disclaimer, the term of this patent is extended or adjusted under 35 U.S.C. 154(b) by 0 days.

(21) Appl. No.: 17/951,344

(22) Filed: Sep. 23, 2022

(65) Prior Publication Data
US 2023/0012933 A1    Jan. 19, 2023

Related U.S. Application Data

(63) Continuation of application No. 15/931,048, filed on May 13, 2020, now Pat. No. 11,453,428.

(60) Provisional application No. 62/846,782, filed on May 13, 2019.

(51) Int. Cl.
*B62B 5/06* (2006.01)
*A45C 13/22* (2006.01)

(52) U.S. Cl.
CPC .............. *B62B 5/068* (2013.01); *B62B 5/065* (2013.01); *B62B 5/067* (2013.01); *A45C 13/22* (2013.01); *A45C 2013/226* (2013.01)

(58) Field of Classification Search
CPC ......... B62B 5/068; B62B 5/065; B62B 5/067; A45C 13/22; Y10T 16/451
See application file for complete search history.

(56) References Cited

U.S. PATENT DOCUMENTS

| | | | |
|---|---|---|---|
| 3,990,745 A | 11/1976 | Rodaway | |
| 4,974,871 A * | 12/1990 | Mao | B62B 3/02 280/655 |
| 5,044,650 A | 9/1991 | Eberle | |
| 5,244,225 A | 9/1993 | Frycek | |
| 5,290,055 A | 3/1994 | Treat | |
| 5,639,109 A * | 6/1997 | Liang | B62B 1/125 280/655 |
| 5,791,761 A | 8/1998 | Bryant et al. | |
| 5,816,374 A * | 10/1998 | Hsien | A45C 5/14 190/115 |

(Continued)

FOREIGN PATENT DOCUMENTS

CN    204814513    12/2015

OTHER PUBLICATIONS

U.S. Appl. No. 15/931,048, filed May 13, 2020.

*Primary Examiner* — Victor D Batson
*Assistant Examiner* — Matthew J Sullivan
(74) *Attorney, Agent, or Firm* — William A. Bonk, III

(57) ABSTRACT

A handle assembly for exerting forces on a vehicle is disclosed. The handle assembly includes a handle, a handle housing, an optional vehicle mounting plate, and a single latching mechanism. The handle has a first support post and a second support post. The first support post has a first end, the second support post has a second end, and the first end is operably coupled with the second end. The handle housing has a first sleeve and a second sleeve. The first sleeve receives the first support post and the second sleeve receives the second support post. The vehicle mounting plate can be attached to the first sleeve and the second sleeve, and mounts the handle onto the vehicle. The single latching mechanism is operably coupled with the handle housing and is capable of releasably engaging at least the first sleeve and the second sleeve.

8 Claims, 22 Drawing Sheets

(56) References Cited

U.S. PATENT DOCUMENTS

| | | | | |
|---|---|---|---|---|
| 5,819,892 A | * | 10/1998 | Deliman | A45C 13/262 280/37 |
| 5,915,712 A | | 6/1999 | Stephenson et al. | |
| 5,984,327 A | * | 11/1999 | Hsieh | A45C 13/385 280/47.27 |
| 6,047,442 A | * | 4/2000 | Workman | A45C 13/262 16/113.1 |
| 6,179,176 B1 | * | 1/2001 | Saggese | A45C 5/146 190/18 R |
| 6,182,529 B1 | | 2/2001 | White | |
| 6,405,816 B1 | | 6/2002 | Kamen et al. | |
| 7,500,689 B2 | | 3/2009 | Pasternak et al. | |
| 7,694,606 B1 | | 4/2010 | Williams | |
| 7,784,816 B2 | * | 8/2010 | Jian | B62B 3/02 280/38 |
| 7,934,727 B1 | * | 5/2011 | Parry | B62B 5/068 16/422 |
| 8,234,755 B1 | | 8/2012 | Brand et al. | |
| 8,407,861 B1 | | 4/2013 | Brand et al. | |
| 8,608,190 B2 | * | 12/2013 | Mountz | B62B 9/20 280/655 |
| 8,646,150 B2 | * | 2/2014 | Okabe | B62B 5/067 16/110.1 |
| 9,327,745 B2 | * | 5/2016 | Tsai | B62B 1/125 |
| D783,464 S | | 4/2017 | Menn | |
| 9,637,149 B1 | * | 5/2017 | Wang | B62B 1/002 |
| 9,894,971 B2 | * | 2/2018 | Scicluna | A45C 13/262 |
| 9,931,255 B2 | | 4/2018 | Haigh | |
| 10,799,406 B2 | * | 10/2020 | Minardo | A61G 5/10 |
| 2008/0106053 A1 | * | 5/2008 | Tsai | B62B 5/06 280/47.315 |
| 2009/0001689 A1 | | 1/2009 | Swenson | |
| 2015/0174755 A1 | | 6/2015 | Rhodes | |

* cited by examiner

TELESCOPING HANDLE

CROSS-REFERENCE TO RELATED APPLICATIONS

This application is a continuation of U.S. patent application Ser. No. 15/931,048, filed May 13, 2020, entitled Telescoping Handle, now U.S. Pat. No. 11,453,428, issued Sep. 27, 2022, which claims the benefit of U.S. Provisional Application Ser. No. 62/846,782, filed May 13, 2019, entitled Telescoping Handle which are hereby incorporated herein by reference in their entireties.

BACKGROUND

The present disclosure pertains to handles, and more particularly to devices and methods for providing an adjustable handle to various devices, also referred to herein as vehicles, such as, for example, but not limited to, personal transporters and luggage. In the case of personal transporters, including wheelchairs, occasions may occur when it is beneficial for an attendant to assist a user in the operation of the personal transporter. Assistance can be provided by interaction with an attendant handle. A useful handle may protrude from the device to which it is attached to provide leverage. However, such protrusions may undesirably increase the dimensions of the device, increase the risk of damage to the handle, and affect aesthetics. Thus a retractable handle can provide benefits while extended and can be stowed when not in use.

SUMMARY

In accordance with some configurations, a handle assembly for exerting forces on a device is disclosed.

The aspects of the present teachings presented herein are not meant to be exclusive, and other features, aspects, and advantages of the present teachings will be readily apparent to those of ordinary skill in the art when read in conjunction with the appended claims and accompanying drawings.

In accordance with one configuration of the present teachings, a handle assembly for exerting forces on a device is disclosed. The handle assembly can include, but is not limited to including, a handle, a handle housing, and a single latching mechanism. The handle can include a first support post and a second support post. The first support post can include a first end, the second support post can include a second end, and the first end can be operably coupled with the second end. The handle housing can include a first sleeve and a second sleeve. The first sleeve can receive the first support post and the second sleeve can receive the second support post. The single latching mechanism can be operably coupled with the handle housing and can be releasably engaged with at least the first sleeve and the second sleeve. The single latching mechanism can include a control toggle and at least one first pin and at least one second pin. The control toggle can include a plurality of positions, and can include operable coupling with a control plate. The first pin and second pin can include operable coupled with the control toggle. The control toggle can include a plurality of positions, the first position can cause the first pin to releasably engage with the first sleeve and the second pin to releasably engage with the second sleeve.

The following features may be included in some configurations of this implementation. The handle assembly can optionally include a device mounting plate. The device mounting plate can optionally be attached to the first sleeve and the second sleeve, and can mount the handle onto the device. The single latching mechanism can optionally include releasable engagement with at least the first support post and the second support post. The first support post can optionally include at least one first cavity, and the second support post can optionally include at least one second cavity. The first cavity can optionally receive the first pin, and the second cavity can optionally receive the second pin. In the first position, the first pin can optionally releasably engage with the first support post, and the second pin can optionally releasably engage with the second support post. The single latching mechanism can optionally include a control toggle and a plurality of pin assemblies. The control toggle can optionally include operable coupling with a control plate. The pin assemblies can optionally include operable coupling with the control toggle. Each pin assembly of the pin assemblies can optionally include a pin, a pin spring, a pin nut, and a latch cable. The pin, pin spring, pin nut, and latch cable can optionally include operable coupling, and the operable coupling can optionally be positioned at least partially within a pin enclosure. At least one of the pins of the pin assemblies can optionally include releasable engagement with at least the first sleeve. The control toggle can optionally include a pivot point, and can optionally be pivotable around the pivot point. The control toggle can optionally include a pivotable configuration with respect to the handle assembly, and each of the pins in the plurality of pin assemblies can optionally include operable coupling with the control toggle adjacent to the pivot point. The single latching mechanism can optionally include a control toggle that can optionally include a plurality of positions, and can optionally include operable coupling with the single latching mechanism. At least one of the plurality of positions can optionally include an indication that the single latching mechanism is in a latched position, and at least one of the plurality of positions can optionally include an indication that the single latching mechanism is in an unlatched position. In some configurations, the device can be a vehicle. In some configurations, the vehicle can be a wheelchair.

In some configurations, a method of adjusting a handle is disclosed. The method can include, but is not limited to including, providing a handle assembly including the handle and a single latching mechanism. The handle can include a first position, a second position, a first latch location, a second latch location, a first support post, and a second support post that can be distal to the first support post. The handle can include a configuration in which, in the first position, the single latching mechanism latches the handle in the first position. The handle can be in the first position. The single latching mechanism can include a control toggle and at least one first pin and at least one second pin. The control toggle can be proximal to the first support post and the second support post, and the control toggle can have a plurality of positions. The at least one first pin and the at least one second pin can be operably coupled with the control toggle. The control toggle in a first of the plurality of positions can cause the at least one first pin to releasably engage with the handle at a first latch location and the at least one second pin to releasably engage with the handle at a second latch location. The method can include disengaging the single latching mechanism to unlatch the handle, adjusting the handle to a second position, and engaging the single latching mechanism to latch the handle in the second position.

In some configurations, the handle can optionally include one or more of the following features. Disengaging the single latch mechanism can include pivoting the single latch mechanism to a first pivot position. Engaging the single latch mechanism can include pivoting the single latching mechanism to a second pivot position. Disengaging the single latching mechanism can include depressing the single latching mechanism. Engaging the single latching mechanism can include releasing the single latching mechanism. In some configurations, the handle can be operably coupled to a device. In some configurations, the device may be a wheelchair.

In some configurations, a method of building a handle assembly for a device, wherein the handle assembly includes a handle housing, a handle, and a latch mechanism, can include, but is not limited to including, receiving the handle with the handle housing. The handle can include a first support post and a second support post, and the handle housing can include a first sleeve to receive the first support post and a second sleeve to receive the second support post. The method can include operably coupling the latch mechanism to the handle housing, and releasably engaging the latch mechanism to the handle at the first support post and the second support post. The latch mechanism can include a latch means at the engagement between the latch mechanism and the handle at the first support post and at the second support post.

In some configurations, one or more of the following features can optionally be included. The method can optionally include operably coupling a first end of the first support post with a second end of the second support post. The handle assembly can optionally include a device mounting plate. The method can optionally include operably coupling the handle housing to the device mounting plate, and mounting the device mounting plate to a device. The latch means can optionally include at least one pin which can optionally include operable coupling to a control toggle. In some configurations, the device can be a vehicle. In some configurations, the vehicle can be a wheelchair.

In some configurations, a method of adjusting a handle is disclosed. The method can include, but is not limited to including, providing a handle assembly including the handle and a single latching mechanism. The handle can include a first position, a second position, a first latch location, a second latch location. The handle can be in the first position. The single latching mechanism can include a control toggle and at least one first pin and at least one second pin. The control toggle can have a plurality of positions. The at least one first pin and the at least one second pin can be operably coupled with the control toggle. The control toggle in a first of the plurality of positions can cause the at least one first pin to releasably engage with the handle at a first latch location and the at least one second pin to releasably engage with the handle at a second latch location. The method can include rotating the control toggle in a first direction which can unlatch the handle, adjusting the handle to a second position, automatically enabling latching of the handle in the second position. In some configurations, the method can include rotating the control toggle in a second direction which can latch the handle in the second position.

In some configurations, the handle can optionally be operably coupled to a device. In some configurations, the device may optionally be a wheelchair.

BRIEF DESCRIPTION OF THE DRAWINGS

The foregoing features of the disclosure will be more readily understood by reference to the following description, taken with reference to the accompanying drawings, in which.

DETAILED DESCRIPTION

Any headings provided herein are for convenience only and do not affect the scope or meaning of the present disclosure. A vehicle, as used throughout, unless otherwise specified, includes, but is not limited to, a personal vehicle, such as a wheelchair or a piece of luggage.

Figure 1A:
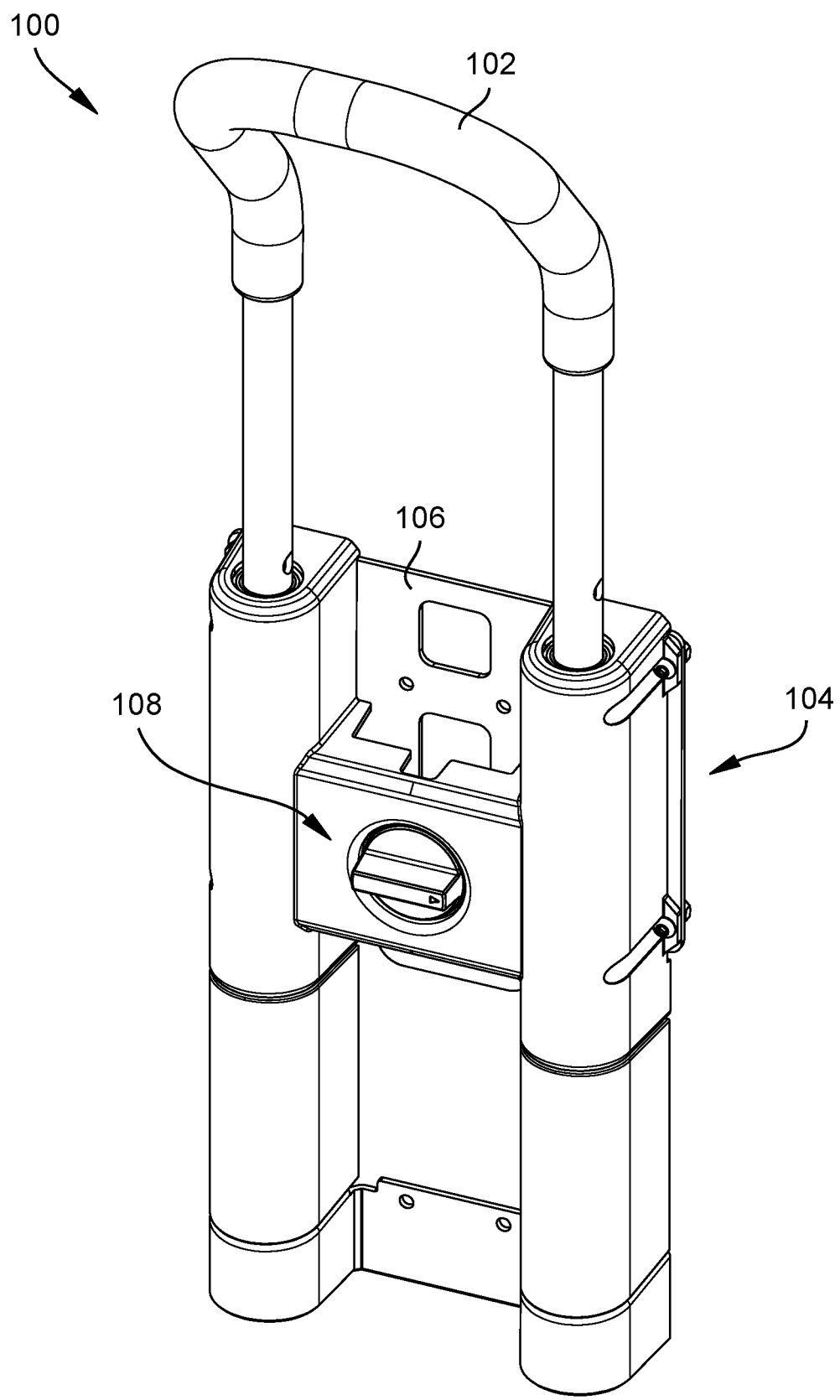
FIGS. 1A-1B are perspective diagrams of the handle assembly of the present teachings.
Figure 1B:
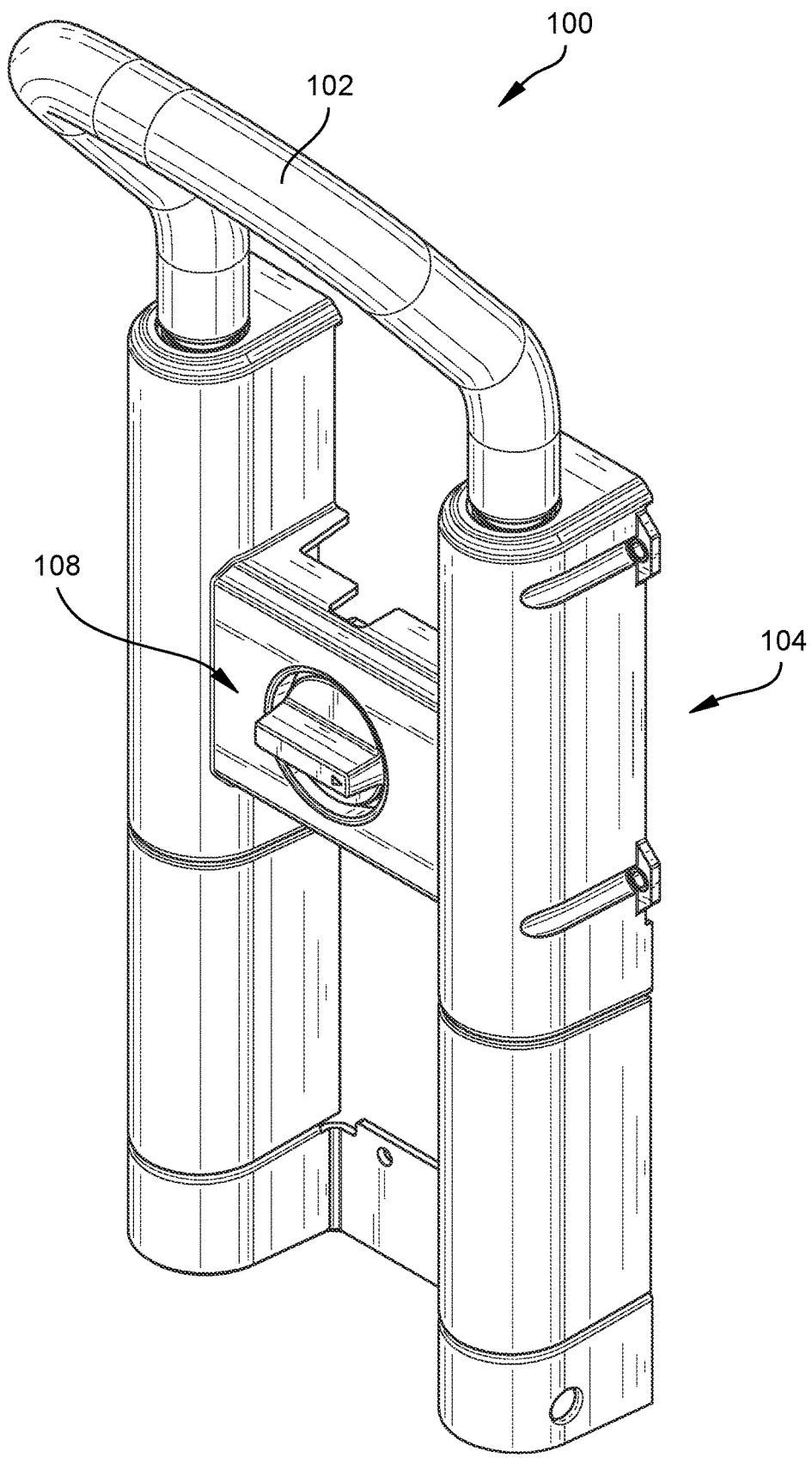

Referring to FIGS. 1A and 1B, an exemplary handle assembly 100 for a vehicle is depicted. Handle assembly 100 may be mounted to a vehicle to provide, in some configurations, a telescoping handle for an attendant to control, or aid in the control of, the vehicle. Handle assembly 100 can include, but is not limited to including, a handle 102, a handle housing 104, a mounting plate 106, and a latching mechanism 108. Handle 102 may be operably coupled with (and/or in, about, on, etc.) handle housing 104. Said retention may be achieved, at least in part, by latching mechanism 108. In some configurations, a user can latch handle 102 in at least one position within handle housing 104 by operating a single control toggle of latching mechanism 108. The control toggle may provide visible and/or tactile indication, and thus latching mechanism 108 may provide a positive indication that handle 102 is properly secured in a position. Further details of the interactions of handle assembly 100 components will become apparent in light of this disclosure. Handle housing 104 may be attached to a vehicle, at least in part, by mounting plate 106. Handle housing 104 may be used to exert a force or forces on a vehicle by attaching handle housing 104 to said vehicle with mounting plate 106, and applying a force or forces to handle 102.

Referring now to FIGS. 2A-2D, exemplary operation of some configurations is depicted. When attached to a vehicle, handle 102 may be in a fully collapsed position that may decrease the exterior dimensions of the vehicle, thereby decreasing the likelihood of unintentional contact with the external environment, such as bumping or snagging. Handle 102 may be in an extended position to provide a user with leverage to manipulate the vehicle as desired. Thus, a method for securing handle 102 in multiple positions can offer the user the flexibility to minimize unintentional contact when handle 102 is not in use, and also extend handle 102 to at least one additional position when desired.

Figure 2A:
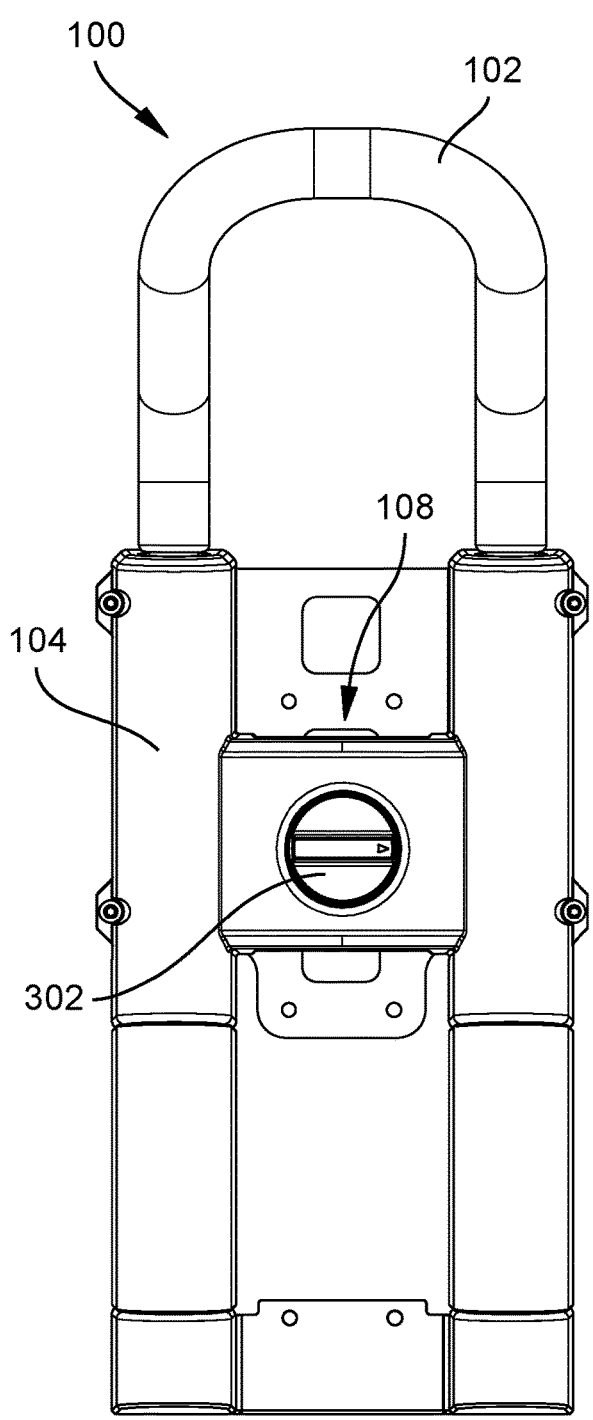
FIGS. 2A-2D are front views of the handle of the present teachings in operation.

Referring to FIG. 2A, a handle assembly 100 is shown. In some configurations, handle 102 may be in a fully collapsed position. Latching mechanism 108 may be engaged with handle 102, which may secure handle 102 to handle housing 104. A user control, such as control toggle 302, may be a component of latching mechanism 108 and may be in a latched position, which may provide visual and tactile indication that handle 102 is in a secured position. In some configurations, if a user desires to alter the position of handle 102, the user may move control toggle 302 into an unlatched position.

Figure 2B:
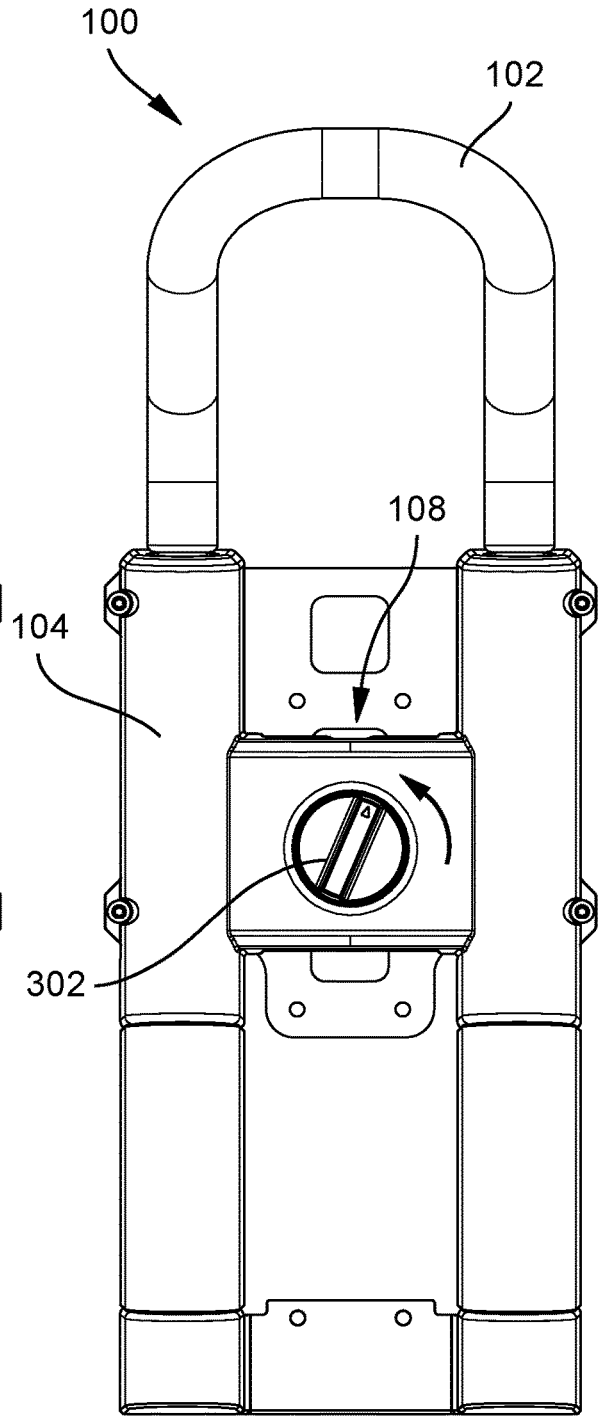

Referring to FIG. 2B, a handle assembly 100 is shown. In some configurations, control toggle 302 may be moved into an unlatched position. Moving control toggle 302 into an unlatched position may disengage latch mechanism 108 from handle 102, which may allow handle 102 to be moved into alternate positions. Moving control toggle 302 into an unlatched position may provide visual and tactile indication that handle 102 is in an unsecured position.

Figure 2C:
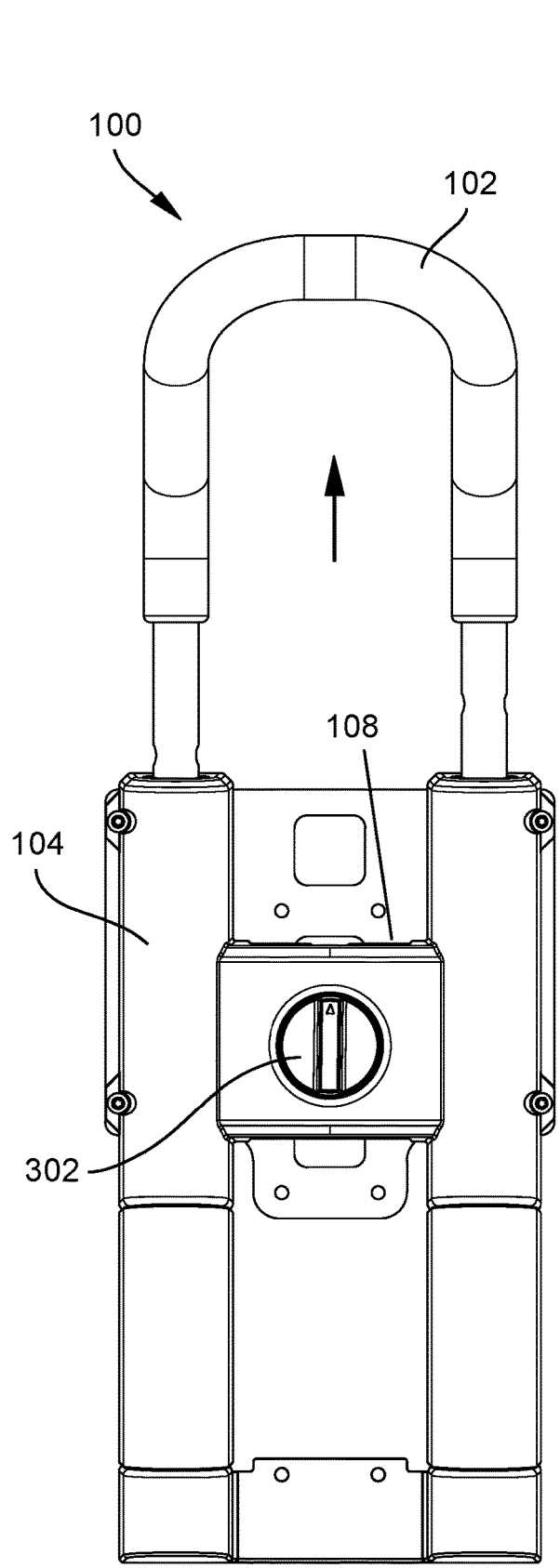

Referring to FIG. 2C, a handle assembly 100 is shown. In some configurations, control toggle 302 may be in a possible unlatched position, and handle 102 may be extended or in transit to an extended position.

Figure 2D:
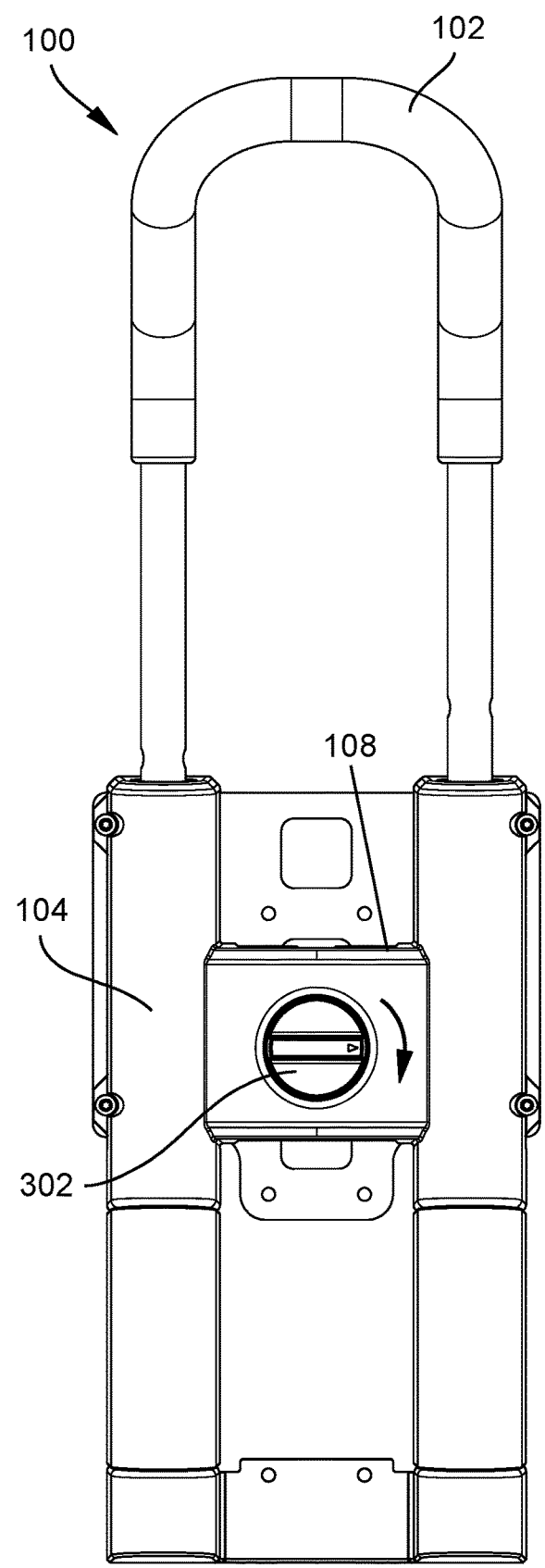

Referring to FIG. 2D, a handle assembly 100 is shown. In some configurations, handle 102 may be in a desired position, and the user may move control toggle 302 into a latched position. Movement of control toggle 302 into a latched position may engage latch mechanism 108 with handle 102, which may secure handle 102 to handle assembly 100, and thus to a vehicle attached to handle assembly 100. Control toggle 302 in a latched position may provide visual and/or tactile feedback indicating handle 102 is securely latched and safe to use. It is to be appreciated in light of this disclosure, that in some configurations, handle 102 may be moved from any current position to any desired position, including fully collapsed, and may be secured in the desired position, in a similar manner.

Figure 3:
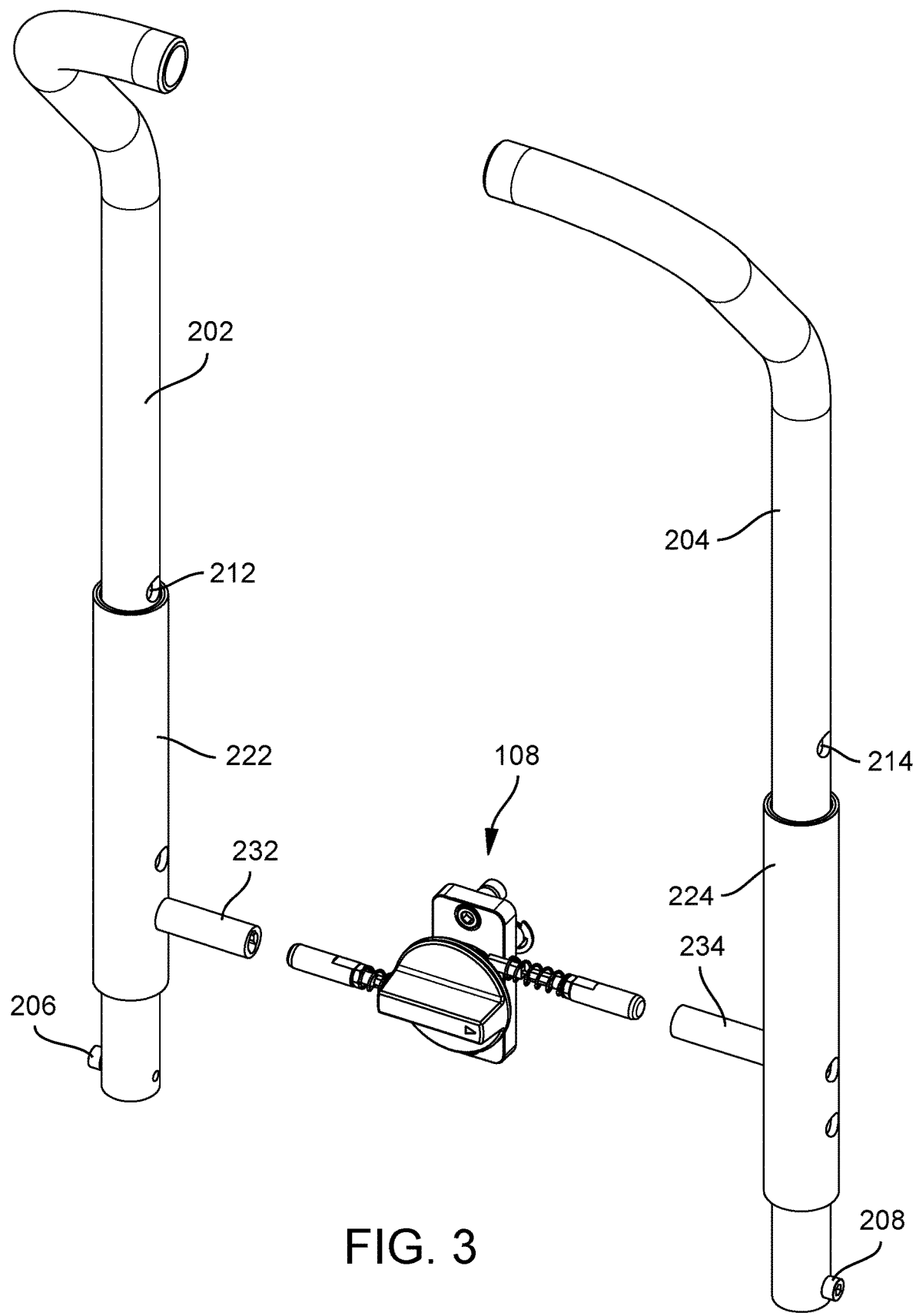
FIGS. 3 and 3A are perspective diagrams of the latching mechanism and posts of the present teachings.
Figure 3A:
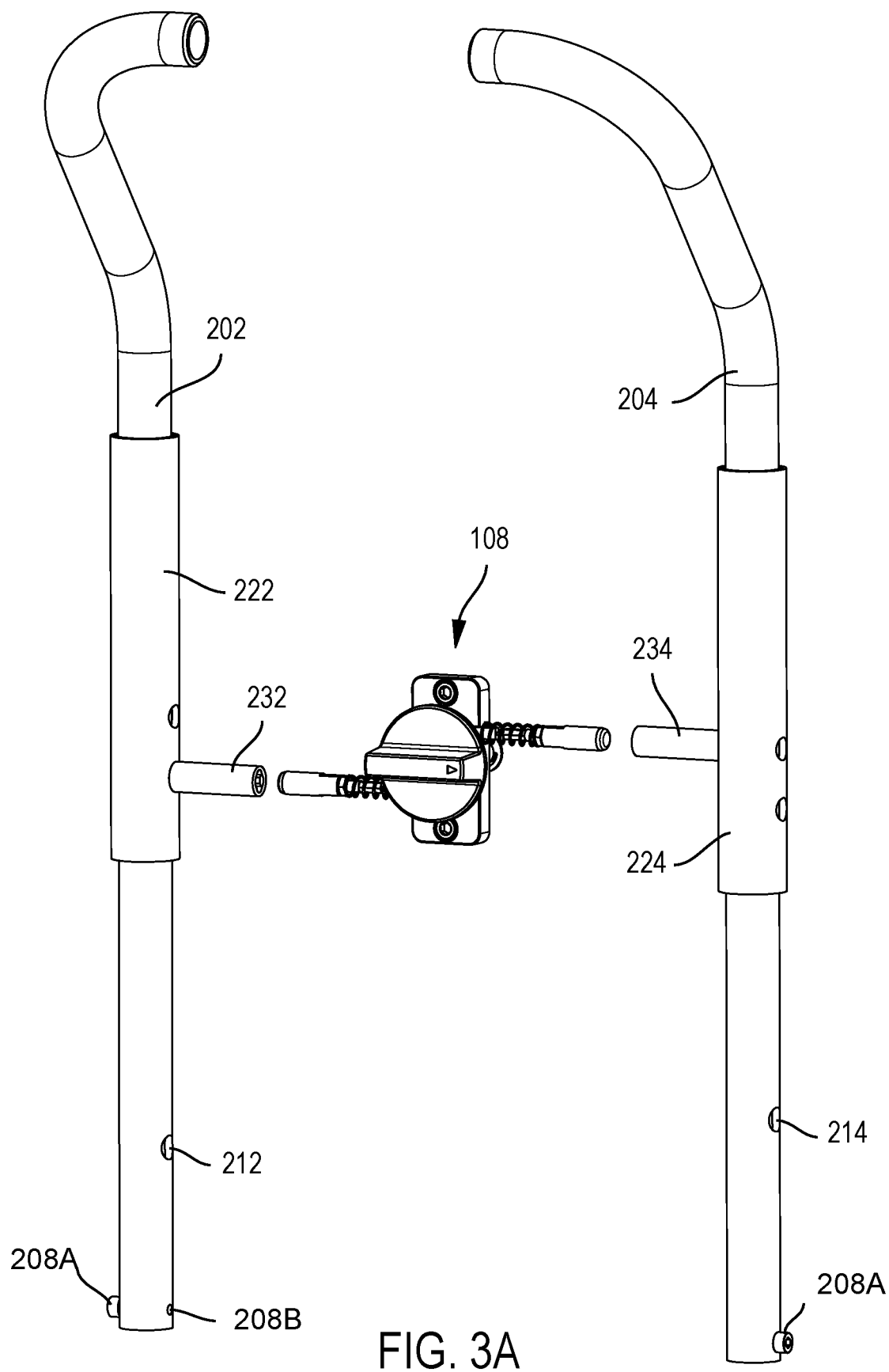

Referring now to FIGS. 3 and 3A, components of some configurations of handle assembly 100 are depicted. Latching mechanism 108 is shown for illustrative purposes and is described in further detail below. Handle 102 may include one or more handle posts, for example, support post 202 and support post 204. The shape of handle posts may be, but is not limited to, a circular cylinder, an oval cylinder, a cube, or a triangular prism. Handle posts may have a solid, hollow, or any other structural cross-section capable of providing sufficient structural support. Support post 202 and support post 204 are shown separated for illustrative purposes, but may be joined together to form handle 102. In some configurations, handle 102 and/or handle posts may be manufactured from any materials capable of handling the exertion of forces upon a vehicle, including, but not limited to, polymers, composites, and metals such as steel, aluminum, and titanium. Handle 102 may be manufactured as a single unit having one or more handle posts. Handle posts may be manufactured separately and may then be joined together to form a cohesive handle 102. There may be a variety of reasons to manufacture handle posts separately, such as reduction of manufacturing complexity, reduced waste, and ability to alter the relative alignment between handle posts after their manufacture. Handle posts may be joined by spot welding, friction welding, or any other joining means known in the art. Handle posts may be joined directly together, or with intervening pieces, such as curved crossbars. A handle post may extend substantially in one direction, and may include curvature or angular bends which may provide an ergonomic, aesthetic, or otherwise improved gripping area in some configurations of handle 102. Handle 102 may include a covering on areas intended to be grasped or otherwise interacted with by a user to apply force. A covering on handle 102 may include visual indication and/or direction to a user to grip handle 102 at the covering. A covering on handle 102 may include material intended to provide a more comfortable gripping surface. Materials may include, but are not limited to, thermoplastic elastomers, rubber, foam, and combinations with these materials. A covering on handle 102 may be achieved by a variety of means, including, but not limited to, overmolding onto handle 102, attaching a cover to handle 102, or attaching a cover over handle 102. In some configurations, support post 202 and support post 204 may be situated in proximity to each other in at least one plane, for example, including, but not limited to, within a range between approximately 3 to 4 inches, 4 to 5 inches, 5 to 6 inches, 6 to 7 inches, 7 to 8 inches, 8 to 9 inches, 9 to 10 inches, 10 to 11 inches, 11 to 12 inches, 3.5 to 4.5 inches, 4.5 inches to 5.5 inches, 2 to 5 inches, 4 to 7 inches, 7 to 12 inches, or 4 to 12 inches, from each other. In some configurations, latching mechanism 108, and/or a component thereof may be situated in proximity to both support post 202 and support post 204, for example, latching mechanism 108 may be situated on the same plane as support post 202 and support post 204, and in some configurations may be situated between support post 202 and support post 204 on at least one plane. See FIG. 9 for an example. In some configurations, support post 202 and support post 204 may be in the same plane, and latching mechanism 108 may be in another plane. In some configurations, latching mechanism 108 may be in one plane with support post 202 and in a different plane with support post 204. A handle post may include one or more cavities, such as cavity 212 and cavity 214, which may provide a specific location or locations for latching mechanism 108 to engage with the handle post. Cavity 212 and cavity 214 may individually be in any location or locations that allow latching mechanism 108 to engage with the handle post. In some configurations, where a handle post may not have one or more cavities, latching mechanism 108 may releasably engage with one or more handle post by other means, for example, by increasing friction between one or more components of handle assembly 100 and the one or more handle post by extending one or more components of handle assembly 100 into contact with one or more handle post. Handle post cavities may be of any depth, including, but not limited to, a depth extending through the entirety of the handle post.

Continuing to refer to FIGS. 3 and 3A, in some configurations handle housing 104 may include one or more post receptacles, such as sleeve 222 and sleeve 224. A post receptacle may include an element or elements to receive a handle post. For example, in some configurations, sleeve 222 may be the same cylindrical shape as support post 202 and sleeve 222 may be hollow with an internal diameter larger than the outer diameter of support post 202, which may allow sleeve 222 to internally receive support post 202. If desired, a handle post lock, such as post locking assembly 206 and post locking assembly 208, may be used to lock a handle post to a post receptacle. For example, in some configurations, support post 202 may be received by sleeve 222, and then post locking assembly 206 may be inserted through support post 202, which may prevent support post 202 from being removed from sleeve 222. In some configurations, post locking 208A can include a single screw, possibly proud from the outer edge of the handle. In some configurations, cavity 208B can be retained to accommodate other locking arrangements.

Figure 6A:
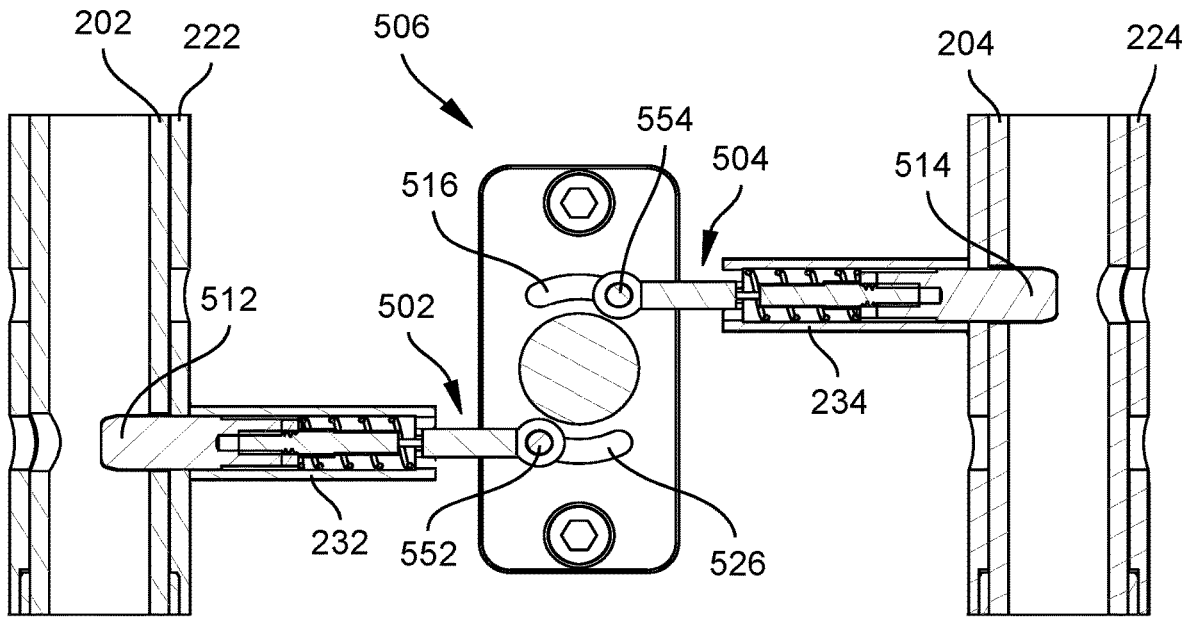
FIGS. 6A-6B are partial cross-sectional diagrams of the latching mechanism of the present teachings.
Figure 6B:
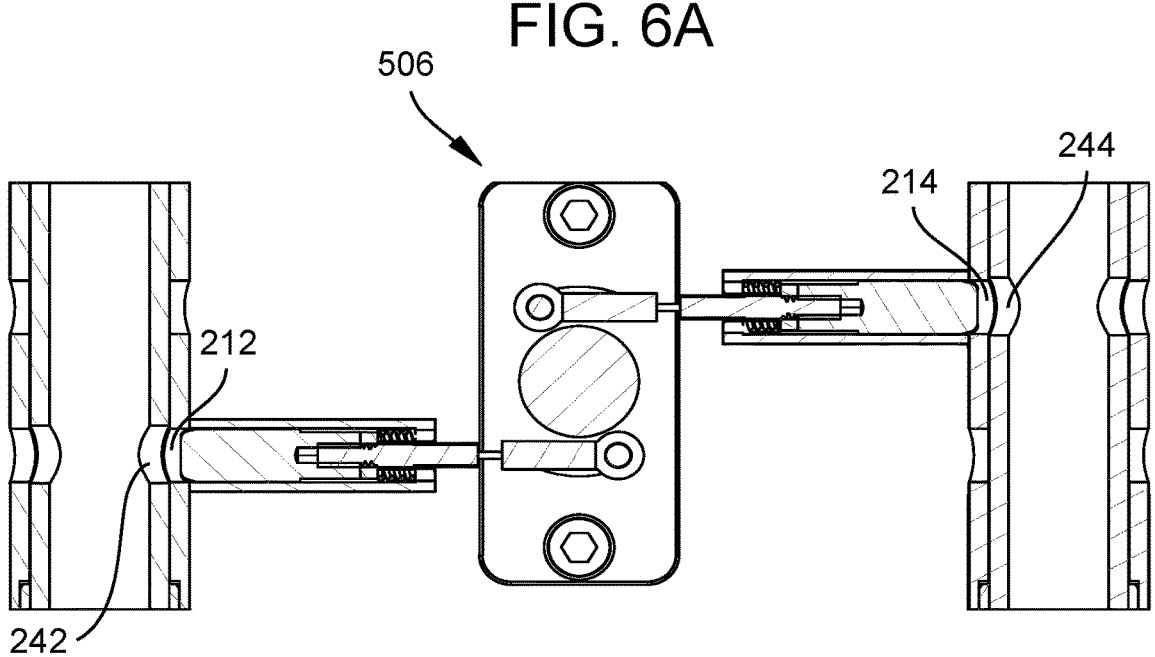

Continuing to refer to FIGS. 3 and 3A, a post receptacle may include one or more receptacle cavities, such as sleeve cavity 242 (FIG. 6B) and sleeve cavity 244 (FIG. 6B). In some configurations, receptacle cavities may be used, for example, to allow latching mechanism 108 to releasably engage with a sleeve by latching mechanism 108 extending into the post receptacle at the receptacle cavity. A post receptacle may include a pin holder, such as pin enclosure 232 and pin enclosure 234. A pin holder may include a hollow body capable of receiving a component of a latching device, such as latching mechanism 108. In some configurations, the pin holder of a post receptacle may be co-extensive with a receptacle cavity of the post receptacle. For example, pin enclosure 232 may be co-extensive with sleeve cavity 242 (FIG. 6B). In some configurations, pin holders may not be coupled to a post receptacle, and may be operably coupled to latching mechanism 108. For example, latching mechanism 108 may include an extendible pin, and pin enclosure 232 may include a hollow cavity large enough to internally receive said pin. Pin enclosure 232 may be used, for example, to allow latching mechanism 108 to releasably engage with one or both of sleeve 222 and sleeve 224 by extending into pin enclosure 232. Pin enclosure 232 may be used in conjunction with sleeve cavity 242 (FIG. 6B) and/or sleeve cavity 244 (FIG. 6B). For example, pin enclosure 232 may include hollow cavity 212 and said cavity 212 may be positioned co-extensive with sleeve cavity 242 in sleeve 222. In this example, a component of latching mechanism 108 may releasably engage with sleeve 222 by extending through pin enclosure 232 and into sleeve 222 at sleeve cavity 242 (FIG. 6B).

Continuing to refer to FIGS. 3 and 3A, in some configurations, a support post may be received by a sleeve, and a latching device, or component thereof, may releasably engage with the support post. For example: support post 202 may have a cavity 212. Sleeve 222 may have a sleeve cavity 242 (FIG. 6B) co-extensive with pin enclosure 232. Support post 202 may be received by sleeve 222, and may be aligned such that cavity 212 may be co-extensive with sleeve cavity 242 (FIG. 6B) and pin enclosure 232. Latching mechanism 108 may include a pin 512 and may be positioned such that pin 512 can extend through pin enclosure 232, through the sleeve cavity of support post 202, and through cavity 212, which may thereby allow latching mechanism 108 to releasably engage with support post 202 through sleeve 222. In some configurations, latching mechanism 108 may releasably engage with more than one support posts through one or more sleeves.

Figure 4:
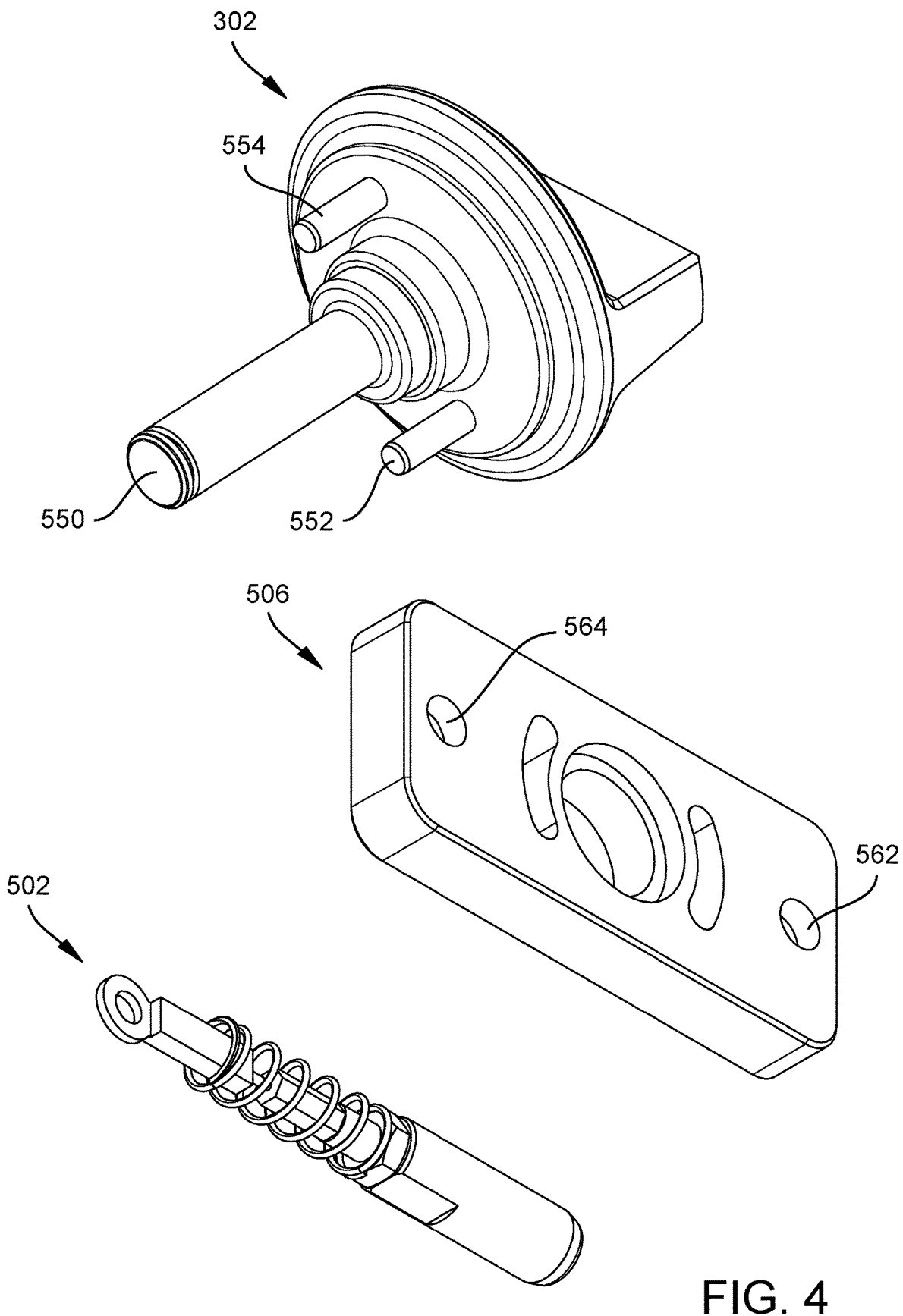
FIG. 4 is a perspective diagram of the latching mechanism of the present teachings.
Figure 7:
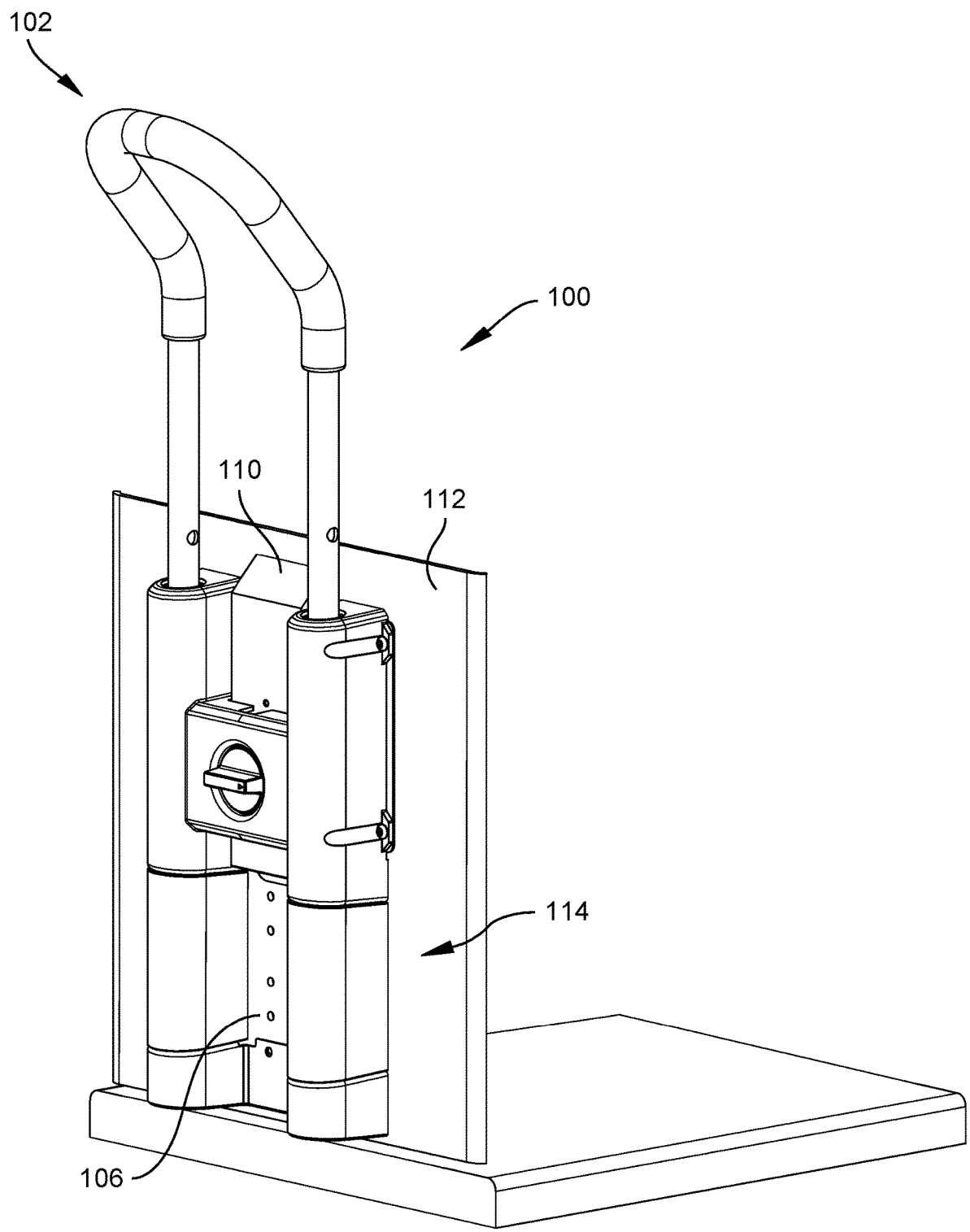
FIG. 7 is a perspective diagram of an exemplary application of the handle assembly of the present teachings.

Referring now to FIG. 4, some components of some configurations of latching mechanism 108 are depicted. Control toggle 302 may include a control shaft 550 and control pins 554 and 552. One or more control pins may be included with control toggle 302. Control pins may be disposed about a central axis (also described as a pivot point herein) of control toggle 302. Control shaft 550 may be centered, in at least one axis, about a central axis of control toggle 302. It should be noted that a central axis of control toggle 302 need not be centrally located in control toggle 302. Control toggle 302 may interface with a control plate, such as latch backplate 506, which may guide motion of control toggle 302. Latch backplate 506 may include latch mounting point 562 and 564. Latch mounting point 562 and 564 may be used to operably connect latch backplate 506 to mounting plate 106 (FIG. 7). For example, in some configurations, bolts may be inserted into latch mounting point 562 and 564 and may extend into latch backplate 506 where the bolts may be secured. In some configurations, latch backplate 506 may be secured to a mounting block 110 (FIG. 7). Pin assembly 502 may interface with control toggle 302 and backplate 506 to engage, disengage, or otherwise operate latching mechanism 108 (FIG. 7).

Figure 5:
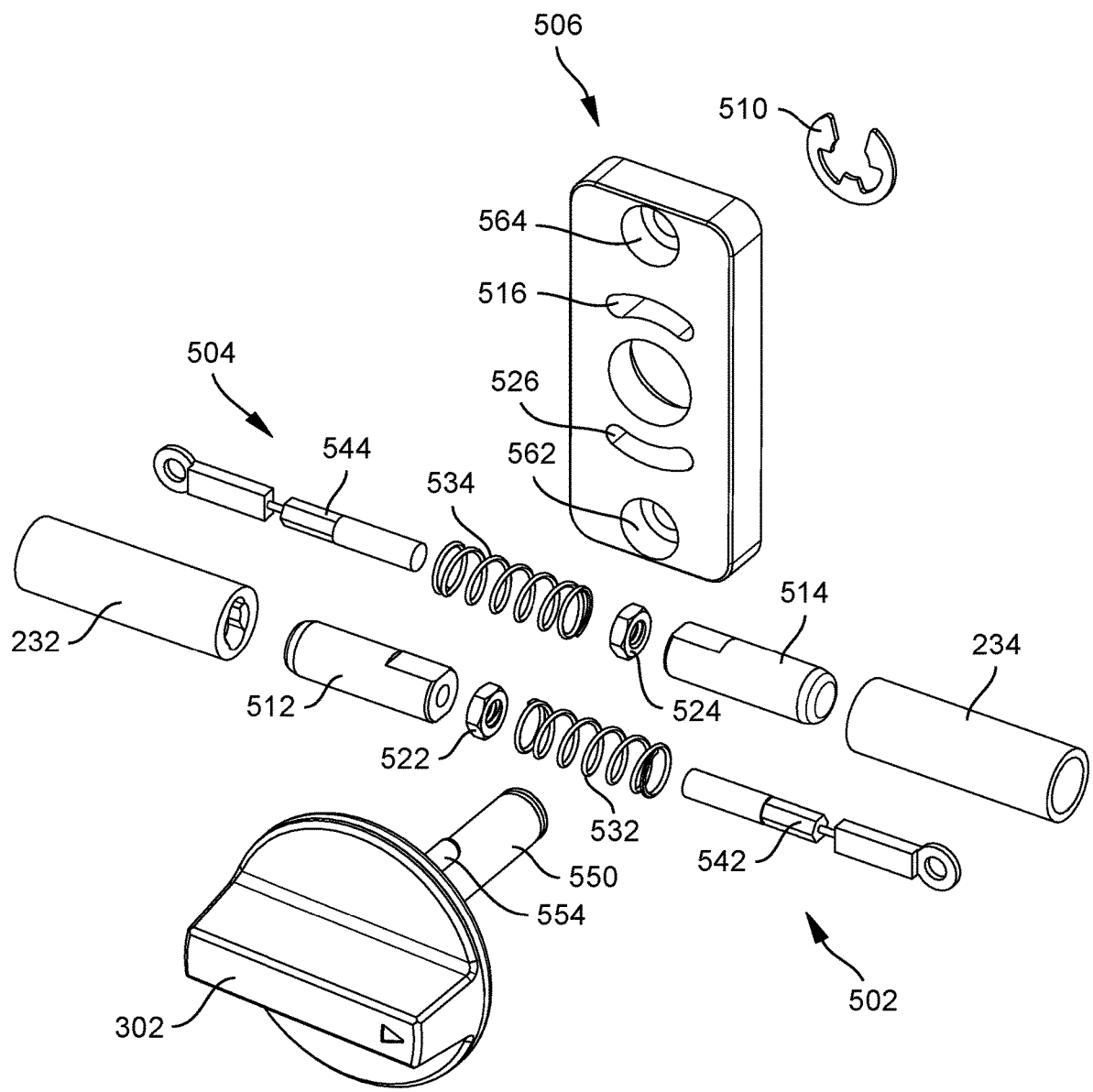
FIG. 5 is an exploded perspective diagram of the latching mechanism of the present teachings.

Referring now to FIG. 5, some components of some configurations of latching mechanism 108 (FIG. 7) are depicted. Control toggle 302 may include a control shaft 550 and control pin 554 (control toggle 302 may include additional control pins, such as a control pin 552 (FIG. 4)). In some configurations, latching mechanism 108 (FIG. 7) may include pin devices, such as pin assembly 502 and pin assembly 504. In an exemplary configuration, pin assembly 502 may include a latch cable 542, which may pass through pin spring 532 and may connect with pin nut 522 and pin 512. In some configurations, pin spring 532 may have dimensions such that it may be held captive on one end by pin 512 and by latch cable 542 on the other end. In some configurations, latch cable 542 may include a flexible body with a connection means on one or both ends, for example, a threaded end, a looped end, or a hooked end. Pin assembly 502 may be partially, fully, or not contained within pin enclosure 232. Pin devices may have features such that the pin device may be able to pass through a cavity within a sleeve. For example, in some configurations, pin assembly 502 may be capable of being enclosed within, and may pass freely through, sleeve 222. Pin assembly 504 may include a latch cable 544, pin spring 534, pin nut 524, and pin 514. In some configurations, pin devices may be operably coupled to a user control, such as control toggle 302. For example, control pin 552 may pass through, or otherwise engage with, latch cable 542. In some configurations, a controller may be operably coupled to a backplate, such as latch backplate 506. For example, control pin 552 may pass into or through latch backplate 506, and toggle retaining pin 510 may be connected with, (e.g., including by, but not limited to, attaching to, attaching on, and/or attaching through), control pin 552, which may prevent control toggle 302 from being uncoupled from latch backplate 506. In some configurations, control pin 552 may be operably coupled with latch cable 542, (e.g., including by, but not limited to, mating by screw and thread, welding, and/or gluing), and further operably coupled with control pin slot 516 (e.g., including by, but not limited to, control pin 552 entering, mating with, and/or engaging control pin slot 516), which may result in the restriction of movement of control pin 552 and pin assembly 502 to the dimensions of control pin slot 516. Thus, in some configurations, application of force to, (e.g., including, but not limited to, pivoting and/or rotation) a control toggle 302 may transfer force to pin assembly 502 and pin assembly 504 which may operate latching mechanism 108. In some configurations, adding additional control pins may allow control of one or more pin devices through a single user control. In some configurations, one or more user controls may be used to control one or more pin devices. In some configurations, latching mechanism 108 (FIG. 7) may be a single latching mechanism having a single user control.

Referring now to FIGS. 6A and 6B, a user control may be used to operate latching mechanism 108 (FIG. 7). In some configurations, application of pivoting force to control toggle 302 (FIG. 5) may pivot control toggle 302 (FIG. 5) about a central axis or pivot point, which may extend pin assemblies 502 and 504, which may thereby operate latching mechanism 108 (FIG. 7). In some configurations, pivoting force may be applied indirectly to a user control by the user. In some configurations, an intermediary device may be used which may translate alternative forms of user force into pivoting or rotational force. For example, a button with a helical screw base may be the intermediary device, where the user applies a linear force to, e.g., presses, the button, which may backdrive the screw, thereby imparting rotational force. Other known methods of translating linear motion to rotational motion should be appreciated. In some configurations, a user control may be remote from the central axis or pivot point, and may be operably connected to latching mechanism 108 (FIG. 7) through an intermediary, including, but not limited to a disc plate centered about the central axis or pivot point, and/or other methods of remote rotational or pivot control known in the art some configurations, movement of each pin device may be considered operating a latching device. In some configurations, there may be other means of operating a latching device, including application of direct or indirect linear force, (e.g., including, but not limited to, pressing and/or pulling). In some configurations, linear motion may be achieved directly by applying a linear force to each pin device which may extend, retract, or otherwise move each pin device. In some configurations, linear motion may be achieved by indirectly applying a linear force to each pin device through an intermediary, (e.g., including, but not limited to, one or more latch tab which may be directly or indirectly connected to a pin device, and/or one or more push rod), which may extend, retract, or otherwise move each pin device.

Continuing to refer to FIG. 6A, latching mechanism 108 (FIG. 7) is depicted in what may be the latched position. Pin 512 is shown extended through sleeve 222 and into support post 202. Likewise, pin 514 is shown simultaneously extended through sleeve 224 into support post 204. In some configurations, pin assembly 504 may be operably connected to latch backplate 506 by control pin 554 which may extend through latch cable 544 into control pin slot 516. For improved visual reference, control toggle 302 is not pictured, however, it should be appreciated that in some configurations, control pin 554 may be operably connected to control toggle 302 (FIG. 4), and rotation of control toggle 302 (FIG. 4) about a central axis or pivot point by a user may result in rotation of control pin 554 about the same central axis or pivot point. Control pin 554 may be capable of, and limited to, movement within control pin slot 516. Control pin slot 516 may be curved such that rotational movement of control toggle 302 and corresponding control pin 554 may follow the curvature of control pin slot 516. It should be appreciated that pin assembly 504 may not be fixedly attached to control pin 554, and therefore may have a broad range of motion. In some configurations, pin assembly 504 may be limited in range of motion by pin enclosure 234. In some configurations, rotation of control toggle 302 (FIG. 5) may move control pin 554 within control pin slot 516, which may cause pin assembly 504 to move in a substantially linear path within pin enclosure 234. Thus, in some configurations, pin assembly 504, and thus pin 514, may be moved linearly upon rotation of control toggle 302 (FIG. 5). In some configurations, pin assembly 502 and pin 512, may be extended in a similar manner when constrained to pin enclosure 232 and to control pin slot 526 by control pin 552. Control toggle 302 (FIG. 5) may include, or be otherwise coupled to, control pin 552 and control pin 554. In some configurations, control pin 552 and control pin 554 may be located in relation to each other such that rotation of control toggle 302 (FIG. 5) may cause control pin 552 to move in a first direction and control pin 554 to move in a second direction. In some configurations, the first direction and second direction may not be the same. In some configurations, control pin 552 and control pin 554 may be located on control toggle 302, such that rotation of control toggle 302 in a counter-clockwise direction about a central axis may cause control pin 552 to move from the left of the central axis to the right of the central axis, and may cause control pin 554 to move from the right of the central axis to the left of the central axis. In some configurations, control pin slot 516 may have a left end and a right end, and control pin slot 526 may have a left end and a right end. The left end of control pin slot 516 may be perpendicular to the left end of control pin slot 526 and the right end of control pin slot 516 may be perpendicular to the right end of control pin slot 526. In some configurations where control toggle 302 may be coupled to latch backplate 506, the positioning of control pin 552 and control pin 554 in relation to control toggle 302 may be such that when control toggle 302 is in a first position, control pin 552 may be situated on the left end of control pin slot 526, and control pin 554 may be situated on the right end of control pin slot 516, left and right being determined by viewing the handle from the side adjacent to the vehicle. Furthermore, rotation of control toggle 302 to a second position may cause control pin 552 to be situated on the right end of control pin slot 526 and may cause control pin 554 to be situated on the left end of control pin slot 516. In this manner, in some configurations, operation of control toggle 302 through rotation may cause a change of positioning of pin 512 and pin 514, in the same or different directions.

Referring again to FIGS. 6A and 6B, in FIG. 6A, a latching mechanism 108 (FIG. 3) may be in an engaged position. Pin 512 and pin 514 may be simultaneously extended into their corresponding support posts through corresponding cavity 212 and 214 and corresponding sleeve cavity 242 and 244, which may operably couple latching mechanism 108 (FIG. 3) with support post 202 and support post 204. In FIG. 6B, control toggle 302 (FIG. 4) may be rotated into a disengaged position, which may simultaneously change the positioning of pin 512 and pin 514, both of which may no longer be operably coupled to their corresponding support post. In some configurations, with the control toggle 302 (FIG. 4) rotated into a disengaged position, the support posts/handle may be moved to alternate positions. In some configurations, with the control toggle 302 (FIG. 4) in the engaged position, force imparted upon the support posts/handle may be transferred through the latching device to the mounting plate and thus to any coupled vehicle.

Referring now to FIG. 7, an example application of handle assembly 100 is depicted. Handle assembly 100 may be operably connected to a seat 112. Seat 112 may be, but is not necessarily, a seat or a frame for a seat of a vehicle. In some configurations, handle assembly may be operably connected to seat 112 by attaching mounting plate 106 to seat 112. In some configurations, mounting block 110 may be used to secure latch backplate 506, and may be attached to mounting plate 106, seat 112, or both mounting plate 106 and seat 112. Shroud 114 may be included in handle assembly 100. Shroud 114 may be used for a variety of reasons, for example, to protect components of handle assembly 100, and/or to improve the appearance of handle assembly 100, and/or to provide a graspable surface.

Figure 8:
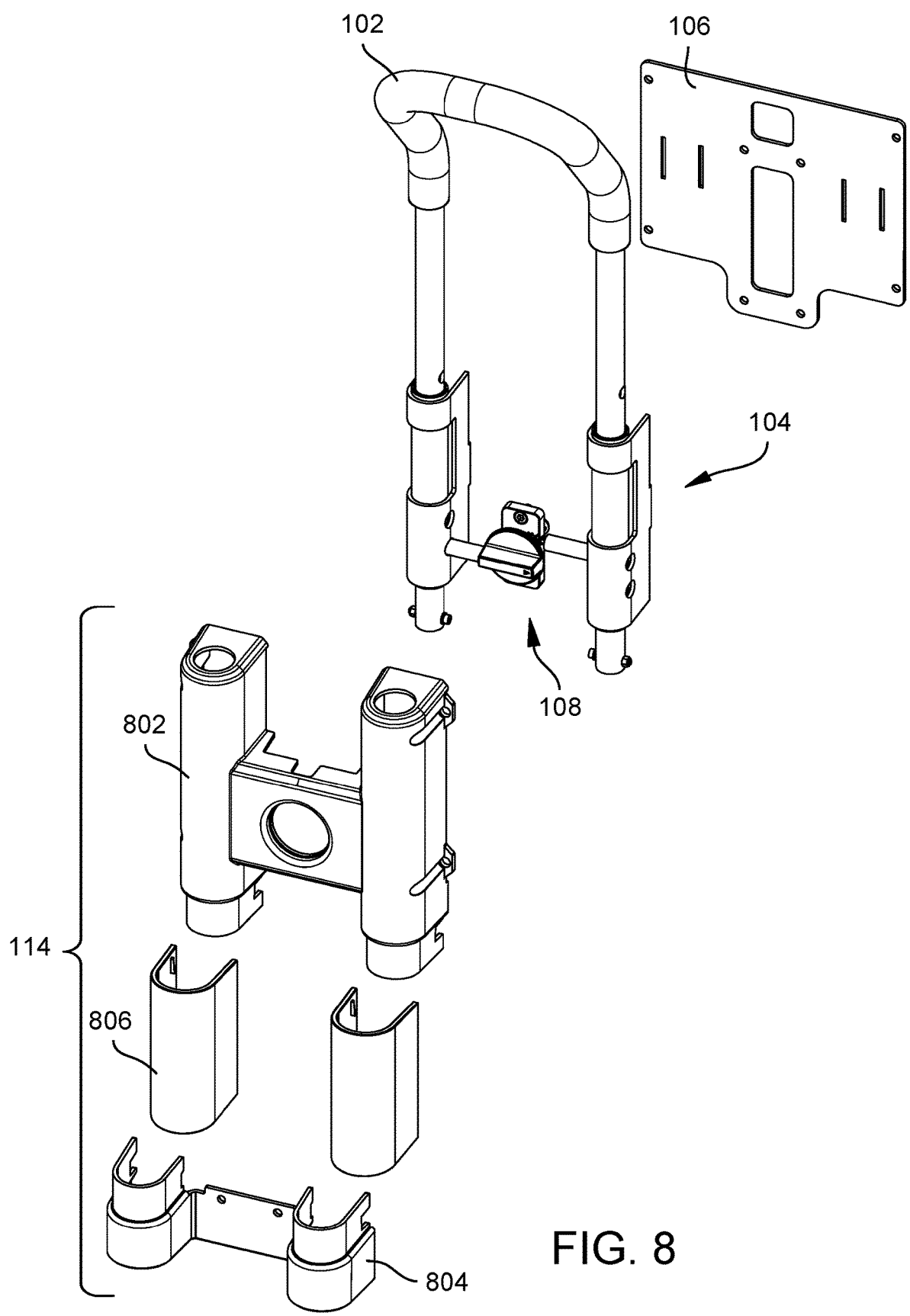
FIGS. 8 and 8A are perspective exploded diagrams of the components of the handle assembly of the present teachings.
Figure 8A:
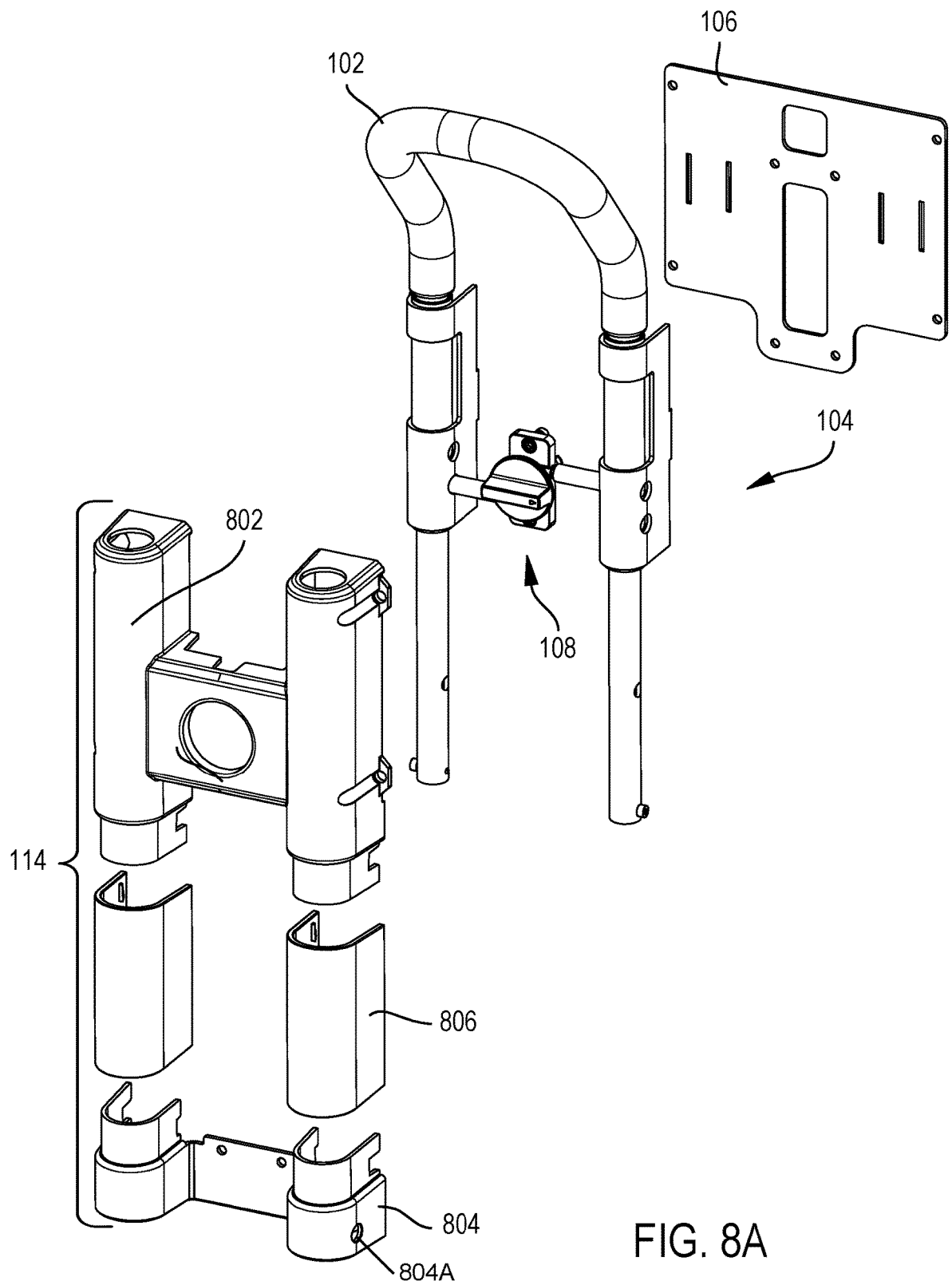

Referring now to FIGS. 8 and 8A, some components of some configurations of handle assembly 100 are depicted. Shroud 114 may be included in handle assembly 100. Shroud 114 may fully enclose, enclose, or partially enclose, on one or more sides, components of handle assembly 100, such as handle housing 104, latching mechanism 108, and mounting plate 106. Shroud 114 may include one or more shroud components, such as body cover 802, base cover 804, and post cover 806. In an example configuration, each of body cover 802, base cover 804, and post cover 806 may at least partially enclose handle housing 104, latching mechanism 108, and mounting plate 106. In some configurations, one or more shroud components may be operably connected to mounting plate 106. For example, body cover 802 and base cover 804 may be capable of being fastened to mounting plate 106. For example, they may contain connection points where fasteners may attach the connection points to mounting plate 106. In some configurations, one or more shroud components may be operably connected to one or more other shroud components. For example, post cover 806 may attach to body cover 802 and base cover 804. In some configurations, base cover 804 can include cutouts that can accommodate water seepage. In some configurations, side holes 804A can be included so that tube handle 102 can be removed by the user without removing shroud components 802, 806, 804. To remove the handle, the user can remove stop screws 208 (FIG. 3) from the bottom of the tube.

Figure 9:
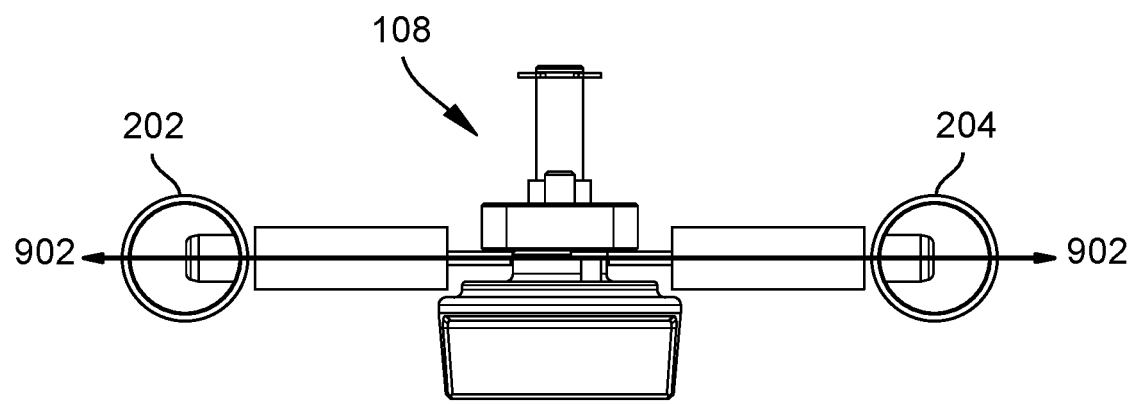
FIG. 9 is a perspective cross-sectional diagram of the latching mechanism and posts of the present teachings.

Referring now to FIG. 9, some components of some configurations of handle assembly 100 are depicted in a perspective cross-sectional view. In some configurations, latching mechanism 108 may be, but is not necessarily, situated on the same plane 902 as support post 202 and/or support post 204. In some configurations, latching mechanism 108 may be situated between, and on the same plane 902 as support post 202 and support post 204. Plane 902 may be any plane joining any two or more points.

Figure 10:
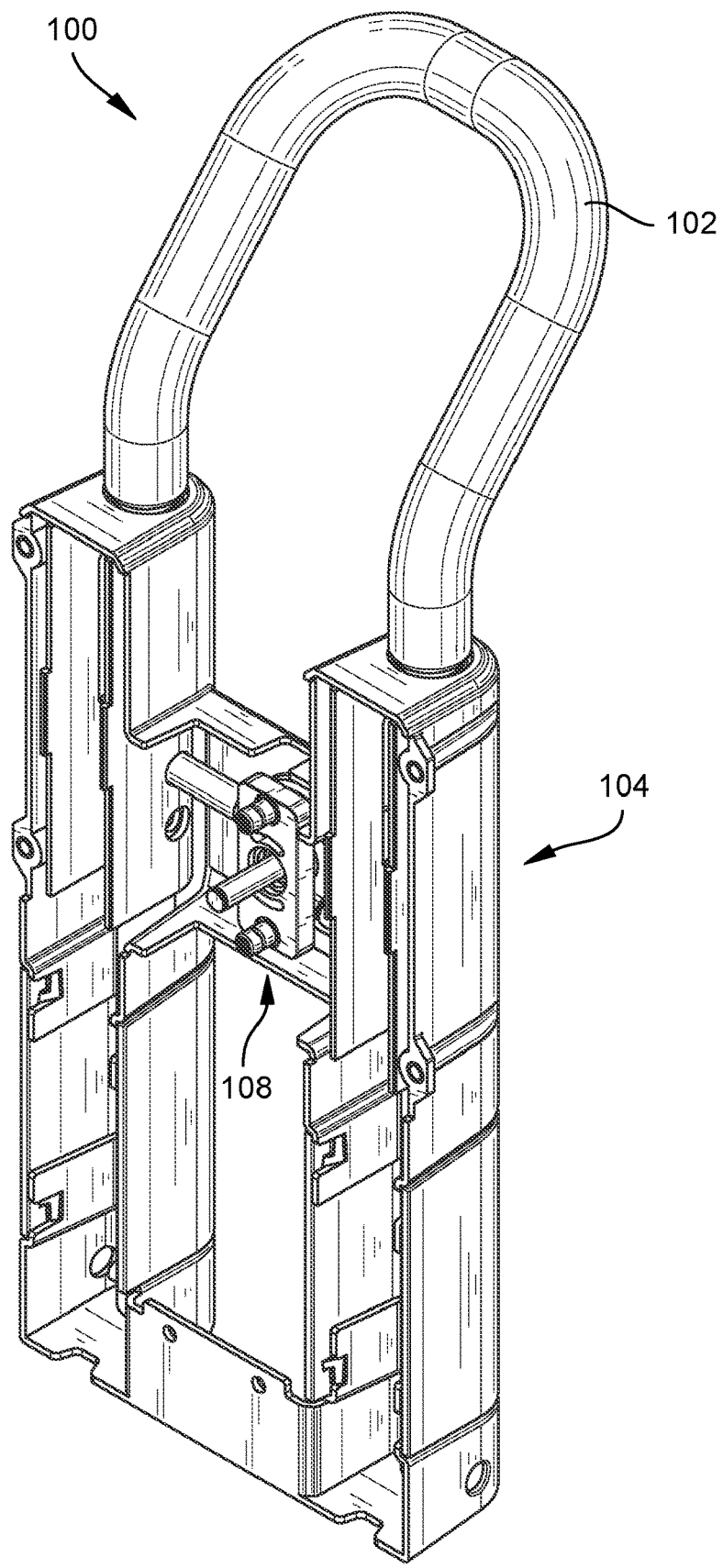
FIG. 10 is a perspective rear side view of the handle assembly of the present teachings.

Referring now to FIG. 10, some components of some configurations of handle assembly 100 are depicted in a perspective rear side view. Handle assembly 100 can include, but is not limited to including, handle 102, handle housing 104, and latching mechanism 108. In some configurations, handle 102 may be in a collapsed position.

Figure 11:
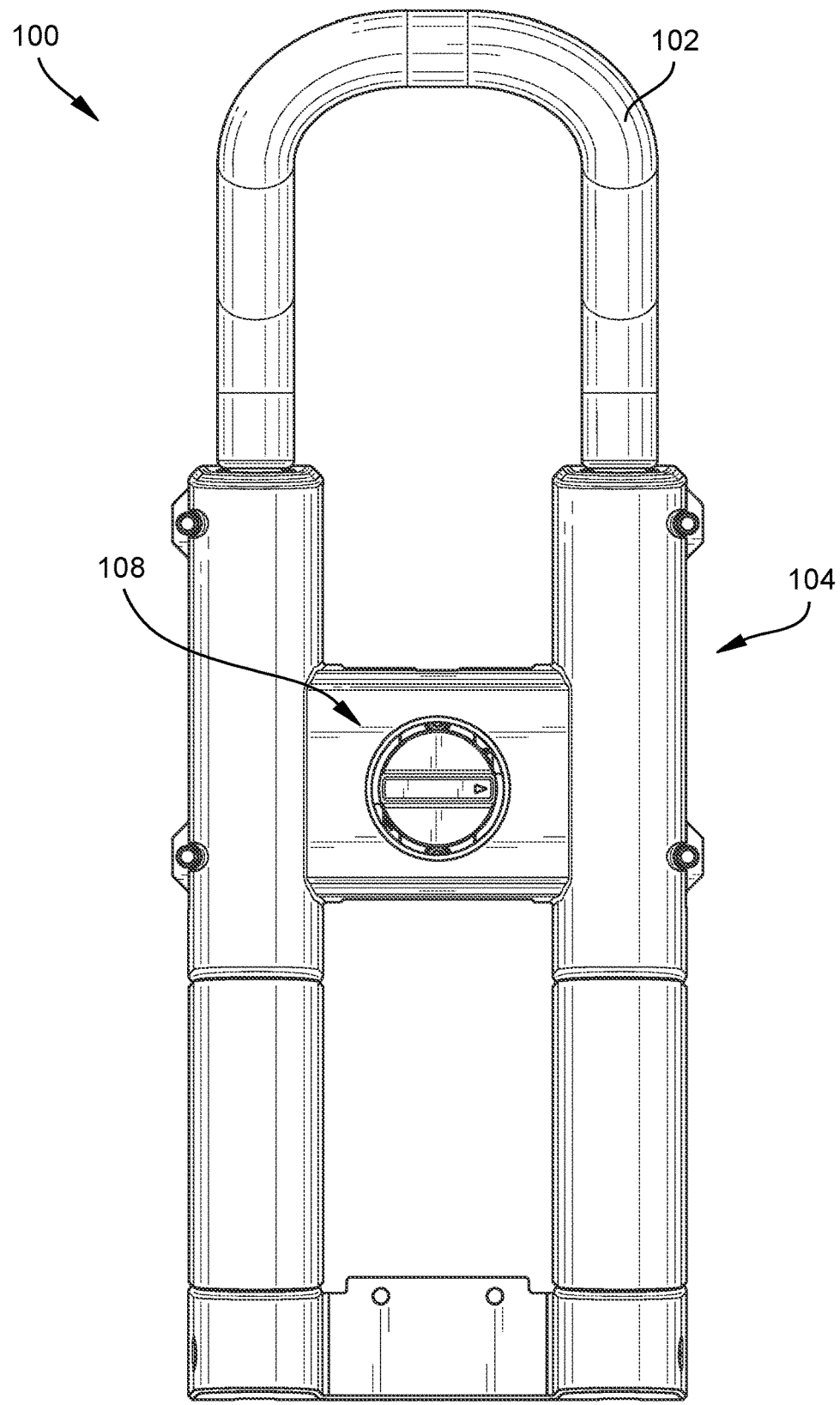
FIG. 11 is a front plan view of the handle assembly of the present teachings.

Referring now to FIG. 11, some components of some configurations of handle assembly 100 are depicted in a front plan view. Handle assembly 100 can include, but is not limited to including, handle 102, handle housing 104, and latching mechanism 108.

Figure 12:
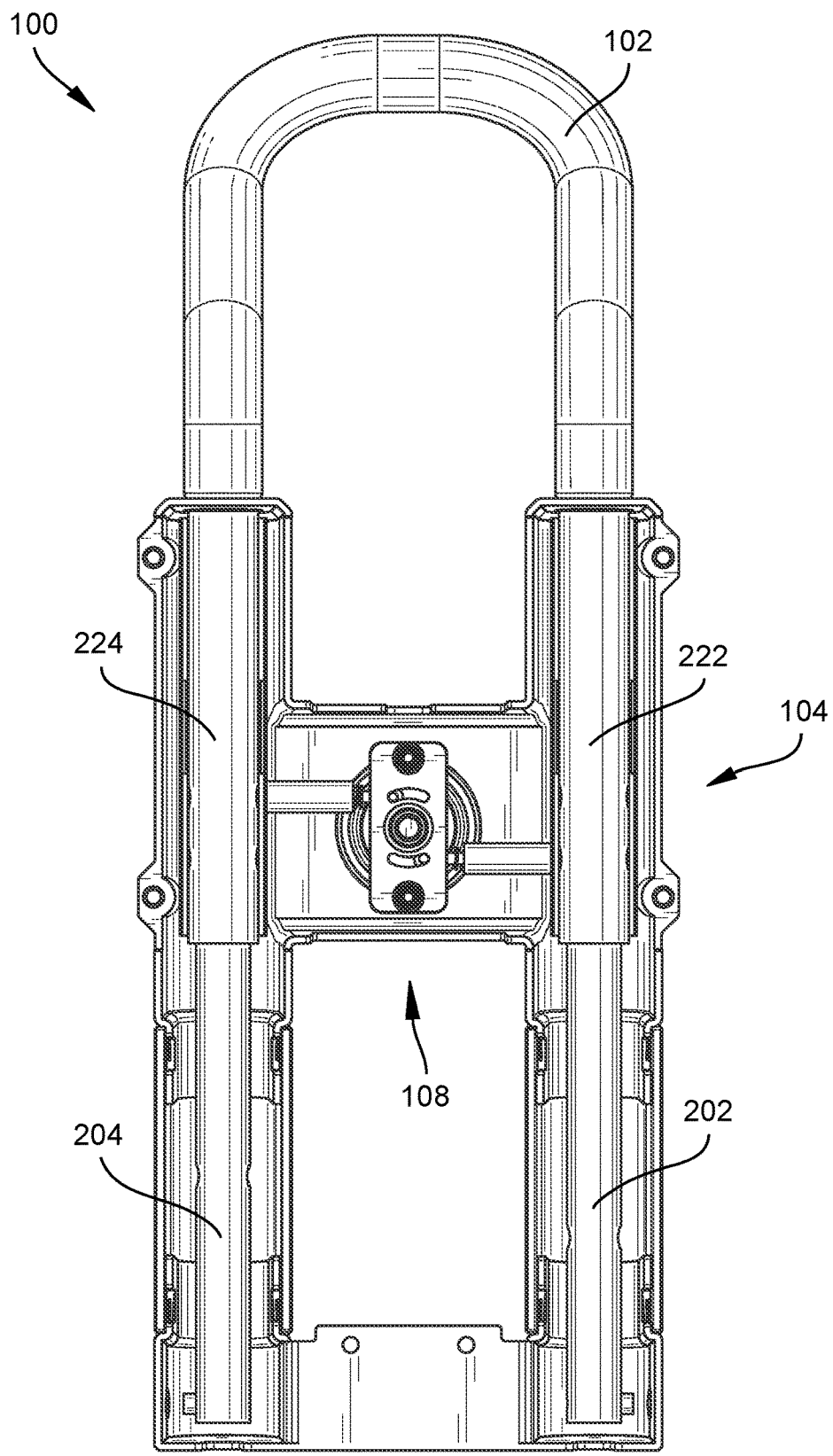
FIG. 12 is a rear plan view of the handle assembly of the present teachings.

Referring now to FIG. 12, some components of some configurations of handle assembly 100 are depicted in a rear plan view. Handle assembly 100 can include, but is not limited to including, handle 102, handle housing 104, latching mechanism 108, support posts 202 and 204, and sleeves 222 and 224.

Figure 13:
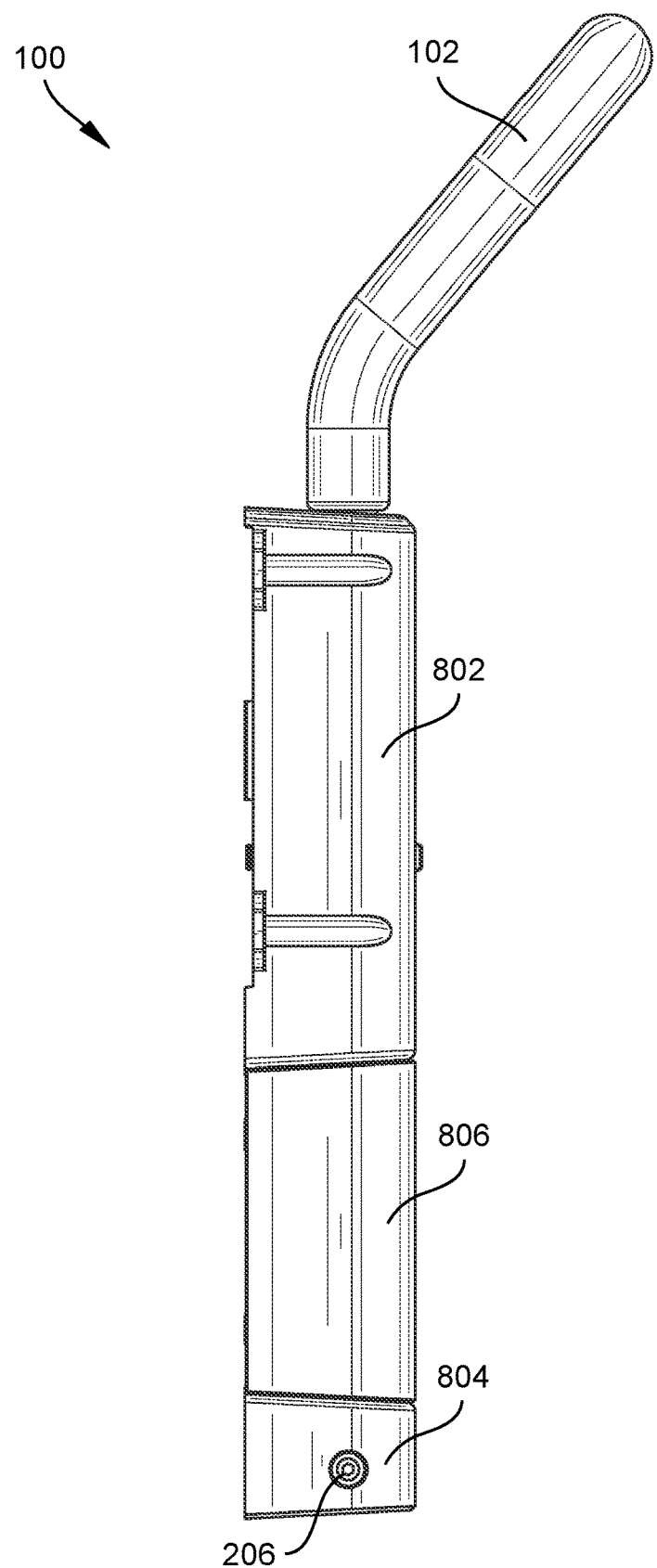
FIG. 13 is a left side plan view of the handle assembly of the present teachings.

Referring now to FIG. 13, some components of some configurations of handle assembly 100 are depicted in a left side plan view. Handle assembly 100 can include, but is not limited to including, handle 102, body cover 802, base cover 804, post cover 806, and post locking assembly 206.

Figure 14:
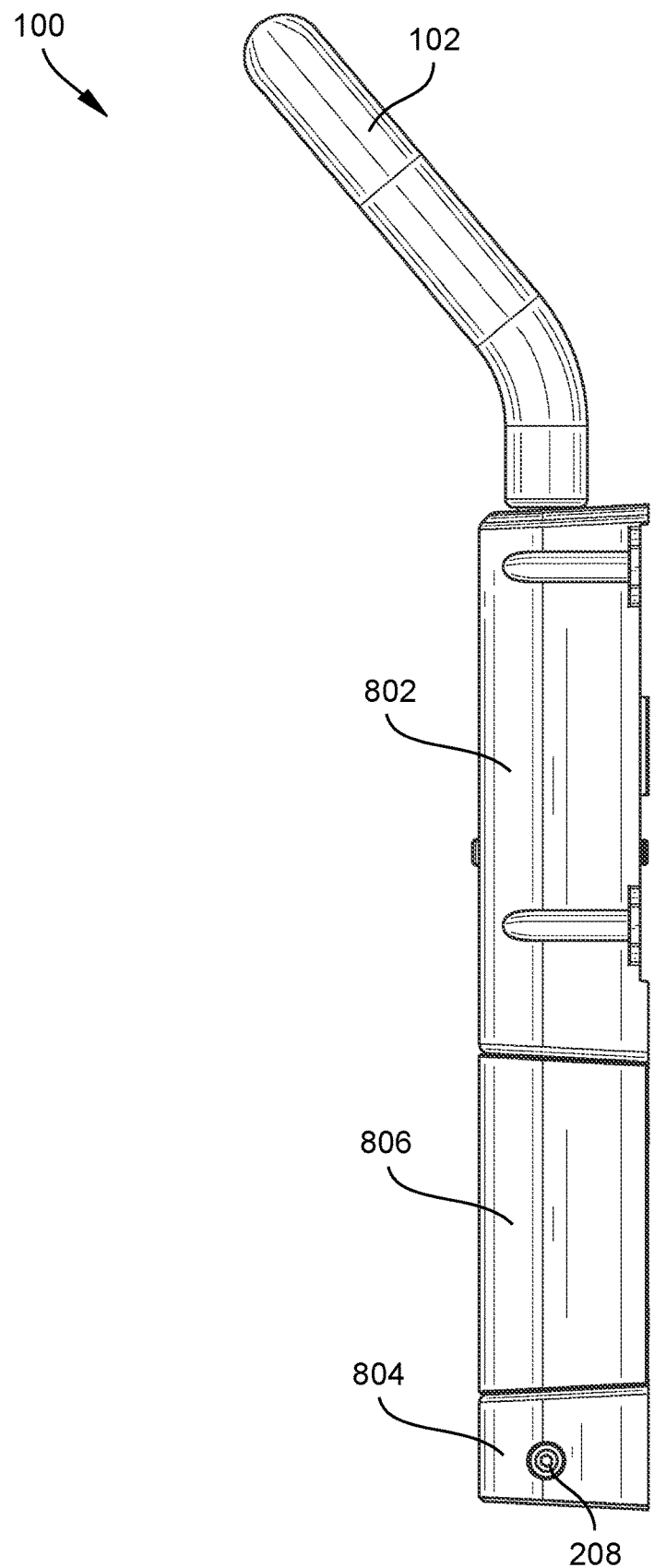
FIG. 14 is a right side plan view of the handle assembly of the present teachings.

Referring now to FIG. 14, some components of some configurations of handle assembly 100 are depicted in a right side plan view. Handle assembly 100 can include, but is not limited to including, handle 102, body cover 802, base cover 804, post cover 806, and post locking assembly 208.

Figure 15:
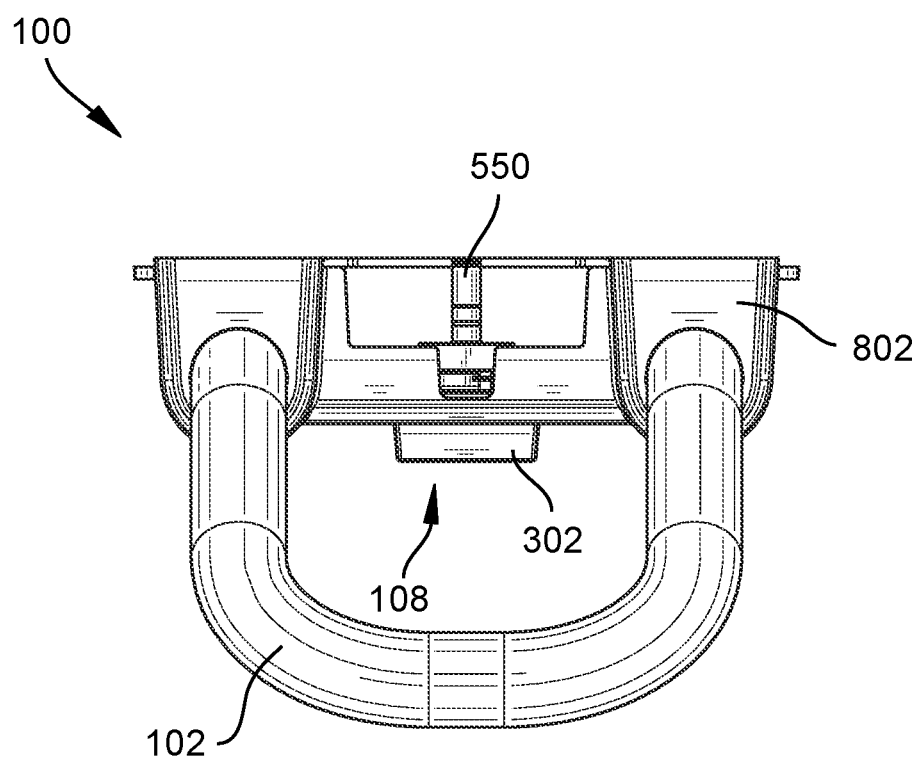
FIG. 15 is a top plan view of the handle assembly of the present teachings.

Referring now to FIG. 15, some components of some configurations of handle assembly 100 are depicted in a top plan view. Handle assembly 100 can include, but is not limited to including, handle 102, body cover 802, and latching mechanism 108. Latching mechanism 108 can include, but is not limited to including control toggle 302 and control shaft 550.

Figure 16:
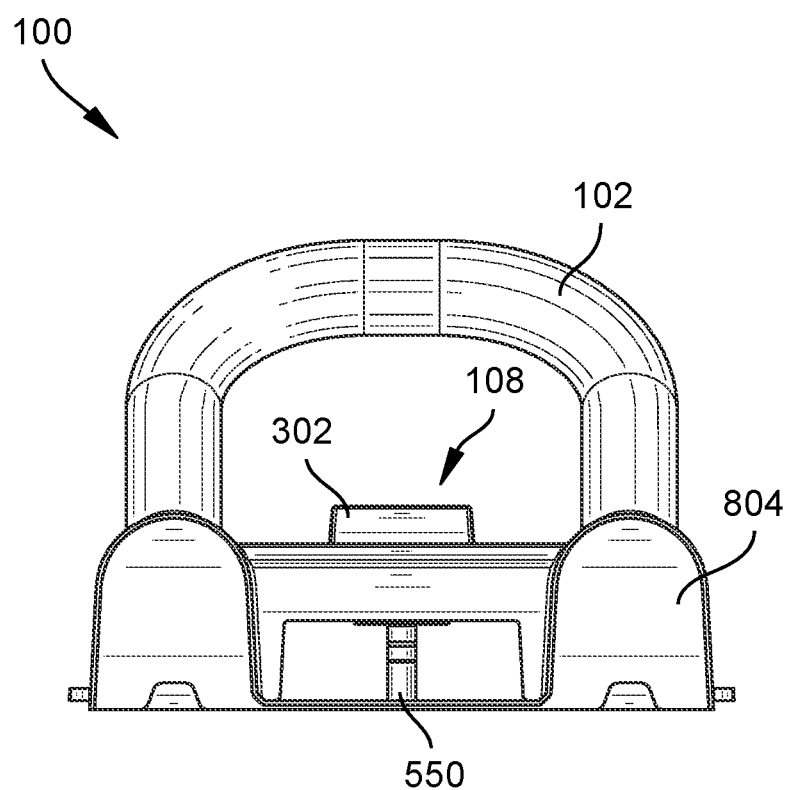
FIG. 16 is a bottom plan view of the handle assembly of the present teachings.

Referring now to FIG. 16, some components of some configurations of handle assembly 100 are depicted in a bottom plan view. Handle assembly 100 can include, but is not limited to including, handle 102, base cover 804, and latching mechanism 108. Latching mechanism 108 can include, but is not limited to including control toggle 302 and control shaft 550.

Figure 17:
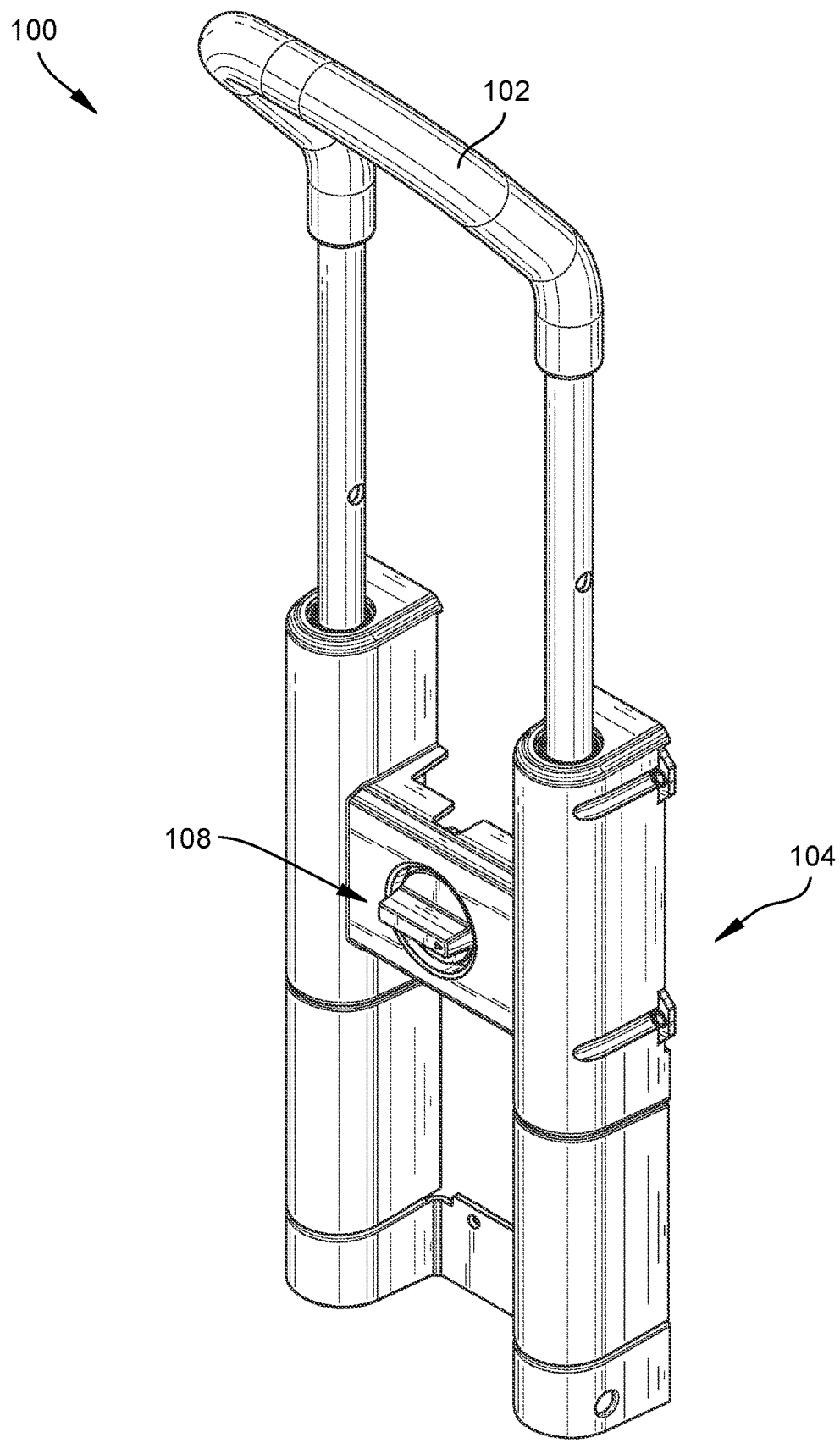
FIG. 17 is a perspective front side view of the handle assembly of the present teachings.

Referring now to FIG. 17, some components of some configurations of handle assembly 100 are depicted in a perspective front side view. Handle assembly 100 can include, but is not limited to including, handle 102, handle housing 104, and latching mechanism 108. In some configurations, handle 102 may be in an extended position.

Figure 18:
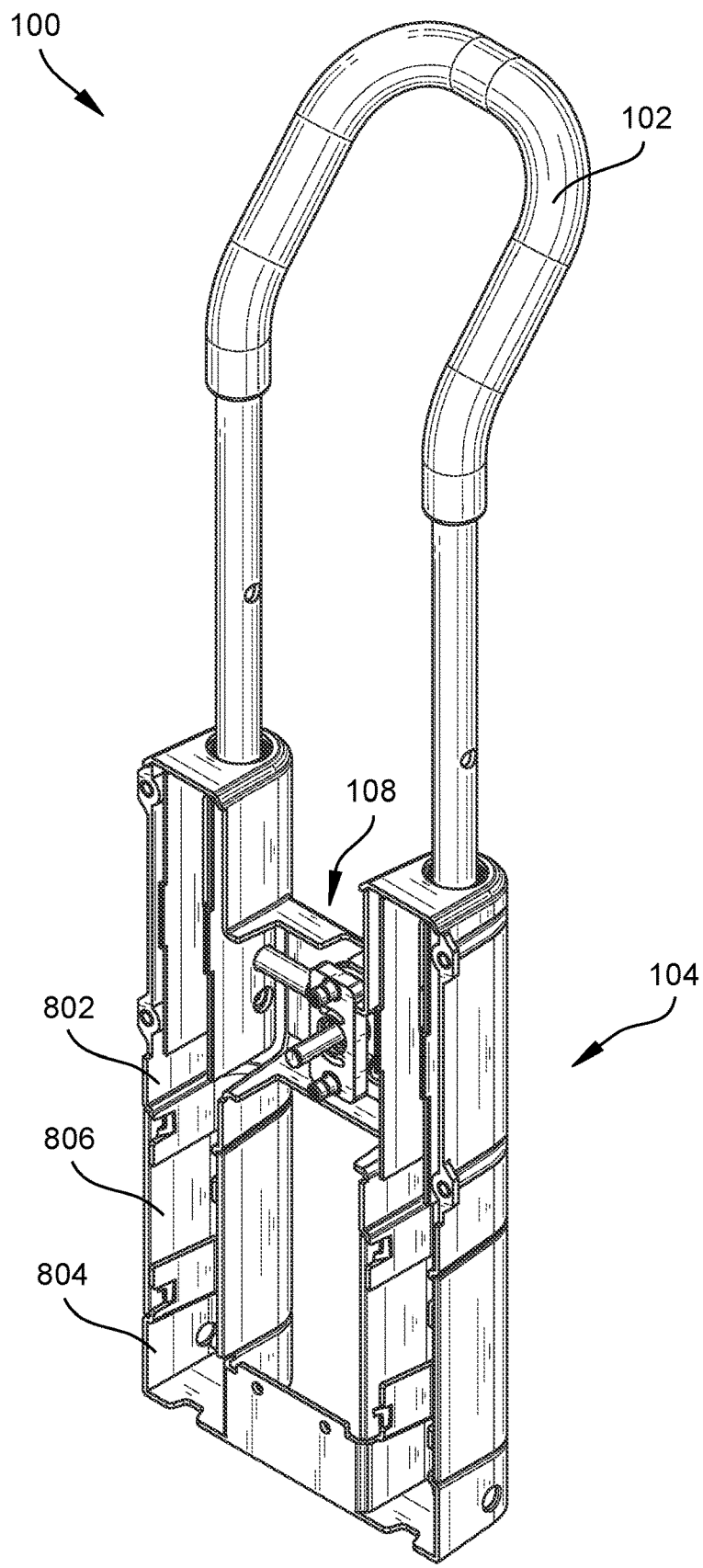
FIG. 18 is a perspective rear side view of the handle assembly of the present teachings.

Referring now to FIG. 18, some components of some configurations of handle assembly 100 are depicted in a perspective rear side view. Handle assembly 100 can include, but is not limited to including, handle 102, handle housing 104, body cover 802, base cover 804, post cover 806, and latching mechanism 108. In some configurations, handle 102 may be in an extended position.

Various alternatives and modifications can be devised by those skilled in the art without departing from the disclosure. Accordingly, the present disclosure is intended to embrace all such alternatives, modifications and variances. Additionally, while several example configurations of the present disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular configurations. And, those skilled in the art will envision other modifications within the scope and spirit of the claims appended hereto. Other elements, steps, methods and techniques that are insubstantially different from those described above and/or in the appended claims are also intended to be within the scope of the disclosure.

The drawings are presented only to demonstrate certain examples of the disclosure. And, the drawings described are only illustrative and are non-limiting. In the drawings, for illustrative purposes, the size of some of the elements may be exaggerated and not drawn to a particular scale. Additionally, elements shown within the drawings that have the same numbers may be identical elements or may be similar elements, depending on the context.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B.

Furthermore, the terms "first", "second", "third," and the like, whether used in the description or in the claims, are provided for distinguishing between similar elements and not necessarily for describing a sequential or chronological order. It is to be understood that the terms so used are interchangeable under appropriate circumstances (unless clearly disclosed otherwise) and that the example configurations of the disclosure described herein are capable of operation in other sequences and/or arrangements than are described or illustrated herein.

The invention claimed is:

1. A handle assembly comprising:
   a handle housing comprising a first sleeve configured to receive a first support post; and
   a latching mechanism comprising:
       a control toggle operably coupled with:
           a control pin configured to restrict said control toggle by a position of said control pin in a control pin slot; and a first pin;
       whereby articulating said control toggle into a latched position urges said first pin to releasably engage with said first sleeve;
   wherein said latching mechanism further comprises:
       a plurality of pin assemblies operably coupled with said control toggle, each of the plurality of pin assemblies comprising:
           a third pin;
           a pin spring;
           a pin nut; and
           a latch cable,
       wherein said third pin, said pin spring, said pin nut, and said latch cable are configured to define an operable coupling positioned at least partially within a pin enclosure; and
       said third pin is configured to releasably engage with said first sleeve.

2. The handle assembly of claim 1 further comprising:
   a second sleeve configured to receive a second support post; and
   a second pin operably coupled with said control toggle, whereby articulating said control toggle into the latched position causes said second pin to releasably engage with said second sleeve.

3. The handle assembly of claim 2 further comprising a vehicle mounting plate attached to said first sleeve and/or said second sleeve, wherein said vehicle mounting plate is configured to mount said handle onto a vehicle.

4. The handle assembly of claim 3 wherein:
   the first support post has a first cavity configured to receive said first pin;
   the second support post has a second cavity configured to receive said second pin; and
   said control toggle in the latched position causes said first pin to releasably engage with said first cavity and said second pin to releasably engage with said second cavity.

5. The handle assembly of claim 1, wherein said latching mechanism is configured for releasable engagement of the first support post and the second support post.

6. The handle assembly of claim 1, wherein said control toggle comprises a pivot point about which said control toggle is pivotable relative to said handle assembly, said third pin being operably coupled with said control toggle adjacent the pivot point.

7. The handle assembly of claim 1, wherein said control toggle is articulable into an unlatched position.

8. The handle assembly of claim 1 wherein said handle assembly is configured for exerting forces on a vehicle that comprises a wheelchair.

* * * * *